United States Patent
Fishaw et al.

(10) Patent No.: US 6,705,454 B2
(45) Date of Patent: Mar. 16, 2004

(54) ACCUMULATING POWER ROLL CONVEYOR SYSTEM

(75) Inventors: R. Thomas Fishaw, Plymouth, MI (US); Steven J. Richardson, LaSalle (CA)

(73) Assignee: Cinetic Automation Corporation, Farmington Hills, MI (US)

(*) Notice: Subject to any disclaimer, the term of this patent is extended or adjusted under 35 U.S.C. 154(b) by 82 days.

(21) Appl. No.: 09/920,449

(22) Filed: Aug. 1, 2001

(65) Prior Publication Data

US 2003/0034229 A1 Feb. 20, 2003

(51) Int. Cl.[7] .............................................. B65G 37/00
(52) U.S. Cl. ........................ 198/571; 198/572; 198/575; 198/576
(58) Field of Search ................................ 198/571, 572, 198/575, 576, 781.06

(56) References Cited

U.S. PATENT DOCUMENTS

| | | |
|---|---|---|
| 2,734,643 A | 2/1956 | MacRae |
| 3,172,525 A | 3/1965 | Watson |
| 3,193,081 A | 7/1965 | Harrison et al. |
| 3,288,268 A | 11/1966 | Fehely |
| 3,311,219 A | 3/1967 | Boehm |
| 3,369,650 A | 2/1968 | Caretto et al. |
| 3,389,779 A | 6/1968 | Cowlin |
| 3,407,916 A | 10/1968 | Engeler |
| 3,500,992 A | 3/1970 | Tabor et al. |
| 3,547,254 A | 12/1970 | Manetta |
| 3,552,543 A | 1/1971 | Manetta |
| 3,565,236 A | 2/1971 | Southworth et al. |
| 3,570,656 A | 3/1971 | Manetta |
| 3,590,987 A | 7/1971 | Evans et al. |
| 3,797,635 A | 3/1974 | Boisen et al. |
| 3,954,192 A | 5/1976 | Watts |
| 3,960,262 A | 6/1976 | Henig |
| 3,992,182 A | 11/1976 | Frank |

(List continued on next page.)

FOREIGN PATENT DOCUMENTS

| | | |
|---|---|---|
| CA | 726526 | 1/1966 |
| DE | 3443944 C1 | 12/1984 |
| EP | 0 508 532 A1 | 4/1992 |
| GB | 950271 | 2/1964 |
| GB | 1153433 | 5/1969 |
| JP | 57112225 A2 | 7/1982 |

OTHER PUBLICATIONS

Centri–Mation® "Roller–Deck™ Accumulator" Centri–Spray Corporation, 1 page (published prior to Aug. 2001).

DC Business Electric Motor Tightening Systems–Ingersoll–Rand® Automated Production Systems, 3 pages (published 1982).

Electrical Drawings for Chrysler 4.7L Mack Ave. Engine Plant Operation 195 Automation; Electrical Diagram Power Roll Conveyor, Drawing No. MAB1953EE–M–0001, Centri–Spray sheets 1–20 (believed to have been offered for sale or publically used prior to Aug. 2001).

Primary Examiner—Christopher P. Ellis
Assistant Examiner—Rashmi Sharma
(74) Attorney, Agent, or Firm—Harness, Dickey & Pierce, P.L.C.

(57) ABSTRACT

A conveyor for transporting parts includes a first electrical switch, a second electrical switch and an automatically movable stop. In another aspect of the present invention, an accumulating power roll conveyor system has two or more independently driven zones. Yet another aspect of the present invention provides for a part physically contacting against and actuating a switch as the part is located in a zone corresponding with the switch.

53 Claims, 19 Drawing Sheets

U.S. PATENT DOCUMENTS

| | | | | |
|---|---|---|---|---|
| 4,174,777 A | * | 11/1979 | Riehle | 198/781 |
| 4,227,607 A | * | 10/1980 | Malavenda | 198/460 |
| 4,263,789 A | | 4/1981 | Koepke et al. | |
| 4,640,408 A | | 2/1987 | Eaves | |
| 4,798,282 A | | 1/1989 | Sperduti et al. | |
| 5,058,727 A | | 10/1991 | Jahns et al. | |
| 5,082,103 A | * | 1/1992 | Ross et al. | 198/460 |
| 5,086,910 A | * | 2/1992 | Terpstra | 198/572 |
| 5,186,308 A | * | 2/1993 | Munro | 198/572 |
| 5,186,417 A | | 2/1993 | Pritchard | |
| 5,191,967 A | | 3/1993 | Woltjer et al. | |
| 5,228,558 A | * | 7/1993 | Hall | 198/784 |
| 5,261,523 A | | 11/1993 | Gasior et al. | |
| 5,285,887 A | * | 2/1994 | Hall | 198/460 |
| 5,318,167 A | * | 6/1994 | Bronson et al. | 198/577 |
| 5,359,154 A | * | 10/1994 | Tsukasa et al. | 177/145 |
| 5,582,286 A | | 12/1996 | Kalm et al. | |
| 5,881,862 A | | 3/1999 | Fishaw | |
| 5,960,930 A | | 10/1999 | Hawkins | |
| 6,021,888 A | * | 2/2000 | Itoh et al. | 198/783 |
| 6,047,812 A | * | 4/2000 | Horn et al. | 198/781.06 |

* cited by examiner

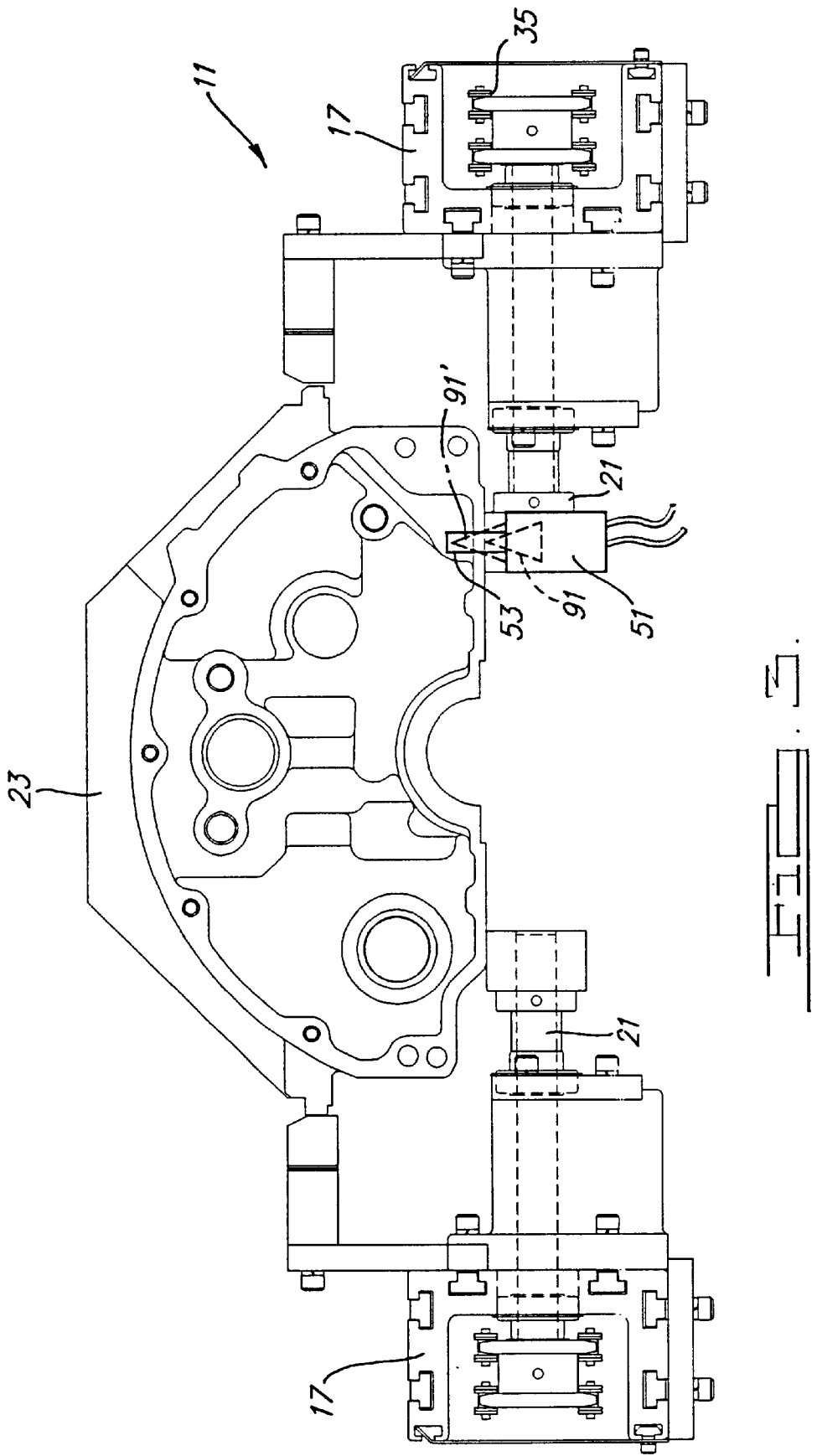

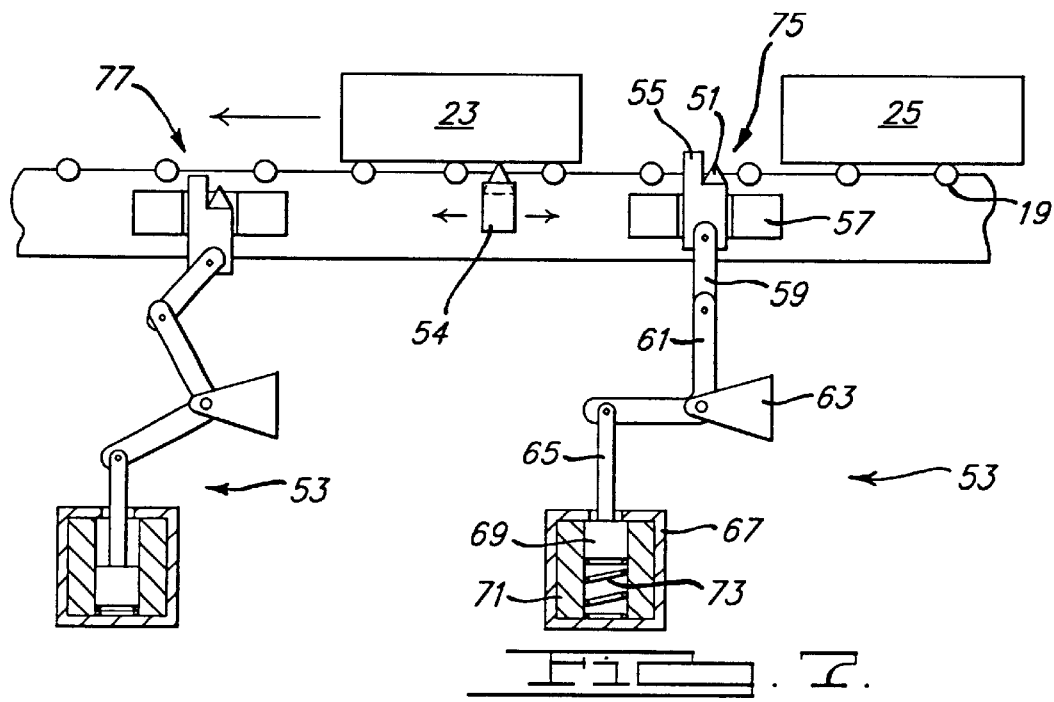
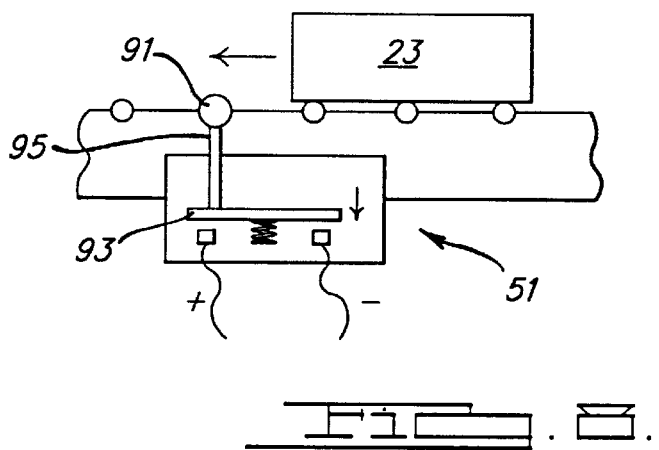

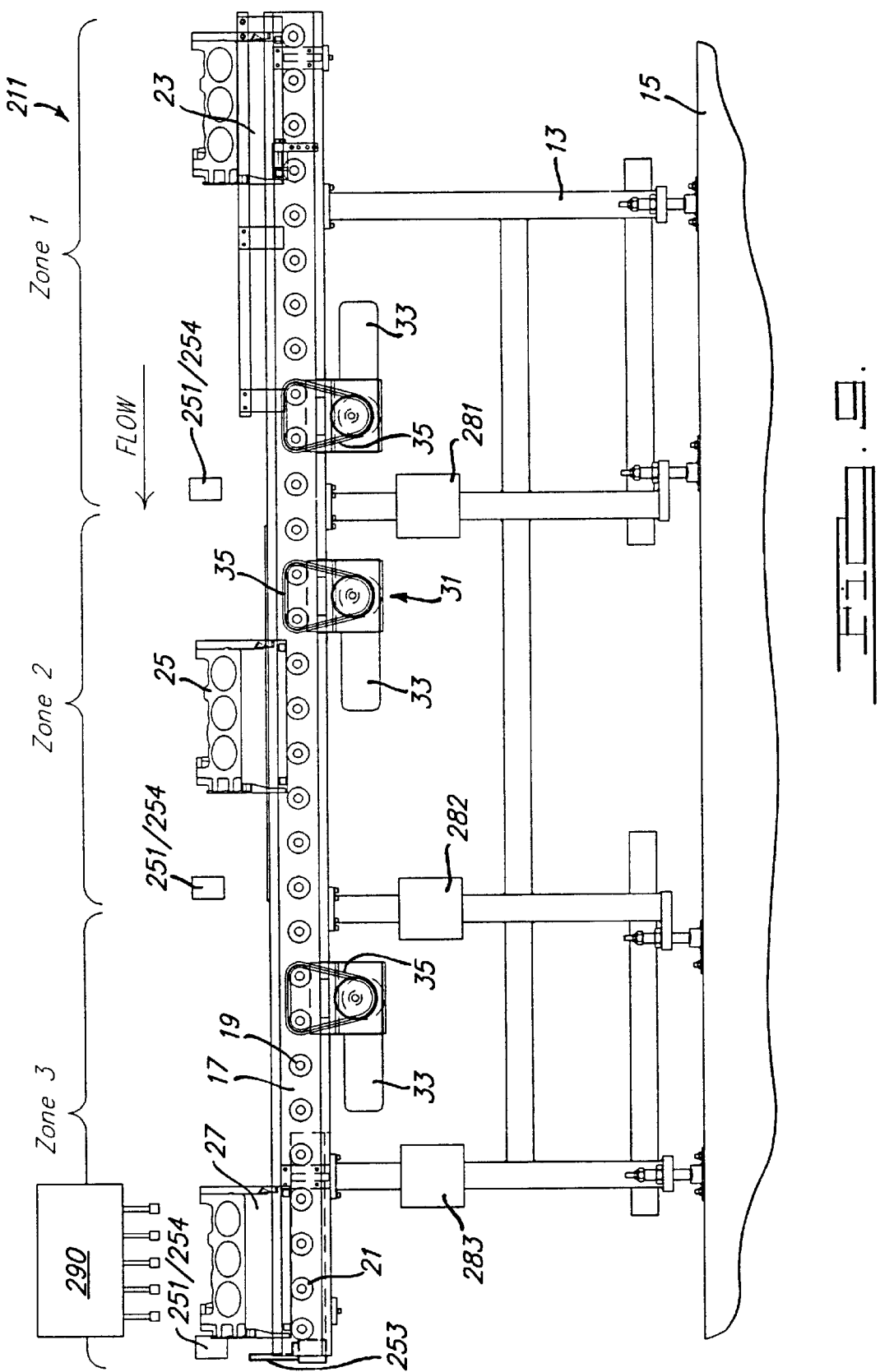

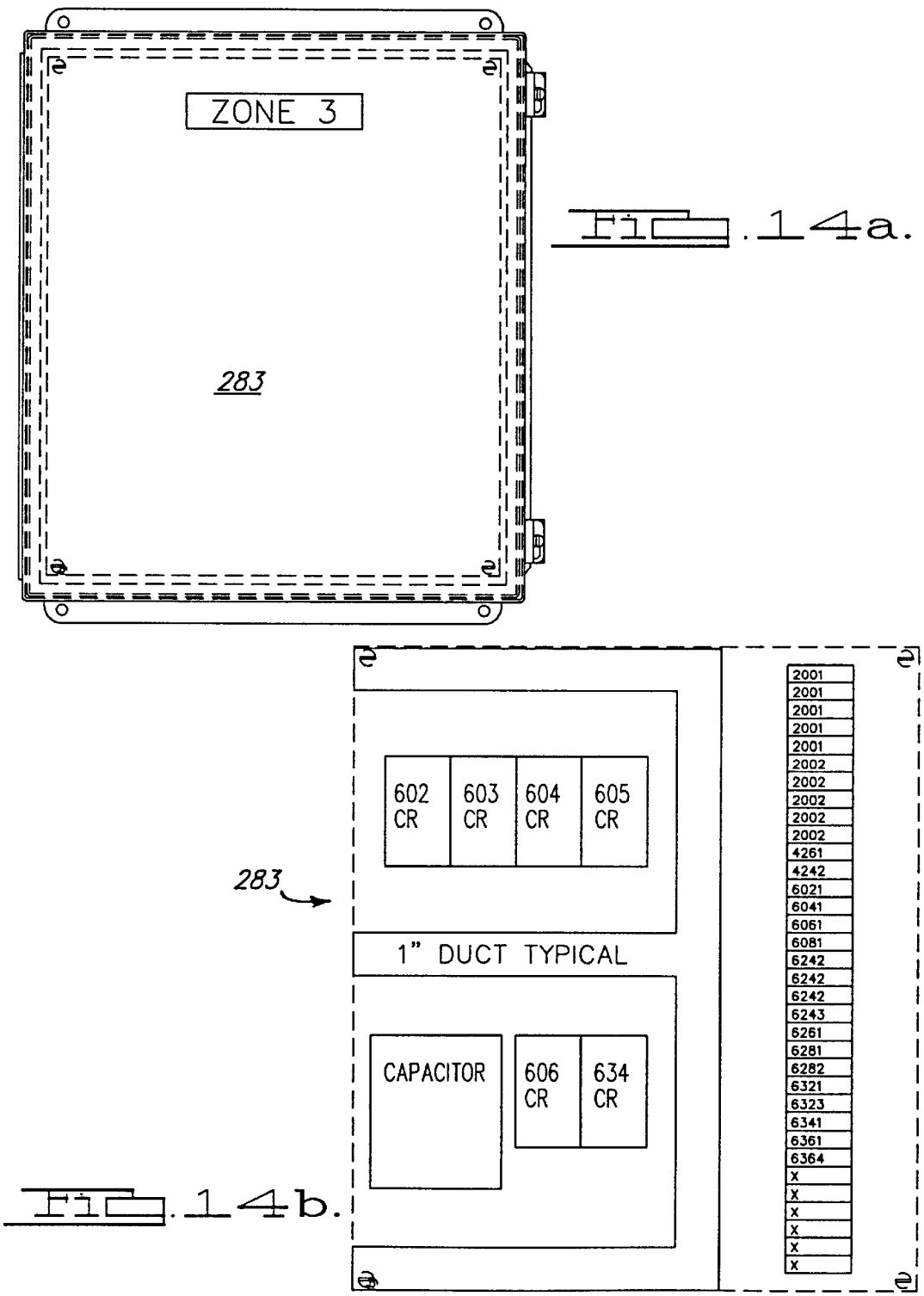

ACCUMULATING POWER ROLL CONVEYOR SYSTEM

BACKGROUND OF THE INVENTION

The present invention relates generally to part conveyors and more particularly to an accumulating power roll conveyor system.

Many traditional conveyor systems employ a series of modular sections divided into multiple zones that are independently powered. These systems typically use programmable logic controllers, also known as PLCs, to control energization of the different zones based on optical, photo electric or proximity switch sensing of parts within the zones. Examples of such systems are disclosed in U.S. Pat. No. 6,021,888 entitled "Conveyor System and Its Control Method" which issued to Itoh et al. on Feb. 8, 2000, and U.S. Pat. No. 5,086,910 entitled "Zone Controlled Conveyance System" which issued to Terpstra on Feb. 11, 1992; both of these patents are incorporated by reference herein. Programmable logic controllers, however, are often expensive and time-consuming to program. U.S. Pat. No. 5,285,887 entitled "Accumulating Conveyor and Control System" which issued to Hall on Feb. 15, 1994, also discloses a complicated electrical controller and photo electric cell sensor arrangement; this patent is incorporated by reference herein. This construction also suffers from conventional cost, set up and maintenance disadvantages.

Conventional accumulating conveyor systems allow for compression of downstream items or parts on the conveyor. This often occurs when there is only a single stop at the end of the conveyor line and the parts are allowed to stack up or bump into each other until the previous downstream part is removed. Part compression may lead to part removal or operation difficulties since upstream contacting parts are often disturbed when the downstream part is moved. Part damage may also occur at the contact points when the parts are in compression. Moreover, U.S. Pat. No. 5,228,558 entitled "Control System for an Accumulating Conveyor" which issued to Hall on Jul. 20, 1993, provides a system that allows for limited compression of the parts by accelerating, decelerating, and stalling drive rollers on the conveyor line, however, part contact can still occur. This patent is also incorporated by reference herein. Finally, it is known to use an escapement mechanism to block and separate parts on a traditional power roll conveyor for a non-zone construction.

SUMMARY OF THE INVENTION

In accordance with the present invention, a conveyor for transporting parts includes a first electrical switch, a second electrical switch and an automatically movable stop. In another aspect of the present invention, an accumulating power roll conveyor system has two or more independently driven zones. Yet another aspect of the present invention provides for a part physically contacting against and actuating a switch as the part is located in a zone corresponding with the switch. A further aspect of the present invention provides three electrical switches connected to three independently energizable actuators, three automatically movable stops and an electrical circuit that does not employ a programmable logic controller. In still another aspect of the present invention, a control system for an accumulating power roll conveyor uses optical sensor switches and independently powered zones, but does not employ a programmable logic controller. A method of operating an accumulating power roll conveyor system is also provided.

The accumulating power roll conveyor system of the present invention is advantageous over conventional systems in that one embodiment of the present invention provides a precise physical stop for parts moving in each zone. This allows for stoppage of part movement in a predetermined location in each zone for subsequent operations on the part and to also prevent undesired compression and contact between adjacent parts on the conveyor line. The present invention is further advantageous by employing an analog electrical circuit rather than the more expensive and difficult to set up, programmable logic controller. In one embodiment of the present invention, the physically contacted switches of the present invention conveyor advantageously reduce the labor and part cost traditionally associated with optical and photo electric sensor switches. Furthermore, the zone driving arrangement of the present invention allows for less expensive and more efficient energy consumption, reduced part-to-part contact, and reduced wear and tear on the actuator system. Moreover, in one embodiment of the present invention, the system advantageously achieves destacking or stripping of adjacent parts if more than one part is inadvertently moving in a single zone. Additional advantages and features of the present invention will become apparent from the following description and appended claims, taken in conjunction with the accompanying drawings.

BRIEF DESCRIPTION OF THE DRAWINGS

FIG. 3 is a diagrammatic end view showing the alternate embodiment accumulating power roll conveyor system;

FIG. 7 is a diagrammatic side view showing movable stops in various positions employed with the alternate embodiment accumulating power roll conveyor system;

FIG. 8 is a diagrammatic side view showing a switch employed with the alternate embodiment accumulating power roll conveyor system;

FIG. 9 is a diagrammatic side view showing a preferred embodiment accumulating power roll conveyor system of the present invention;

FIG. 14a is a side elevational view showing the zone 3 junction box employed in the preferred embodiment accumulating power roll conveyor system; and FIG. 14b is a diagrammatic side view showing the internal componentry of the zone 3 junction box employed in the preferred embodiment accumulating power roll conveyor system.

DETAILED DESCRIPTION OF THE PREFERRED EMBODIMENT

Figure 1:
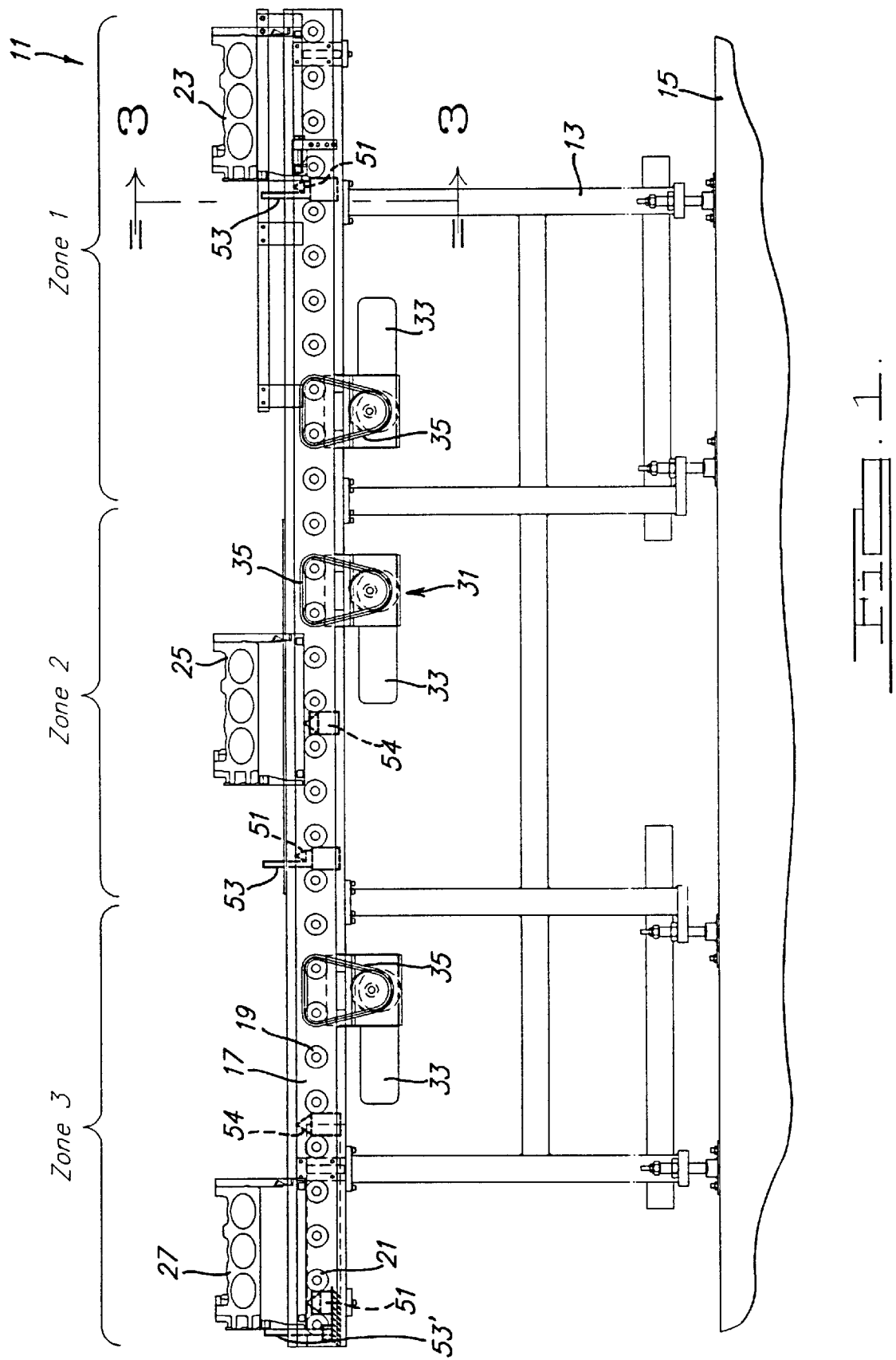
FIG. 1 is a diagrammatic side view showing an alternate embodiment accumulating power roll conveyor system of the present invention.
Figure 2:
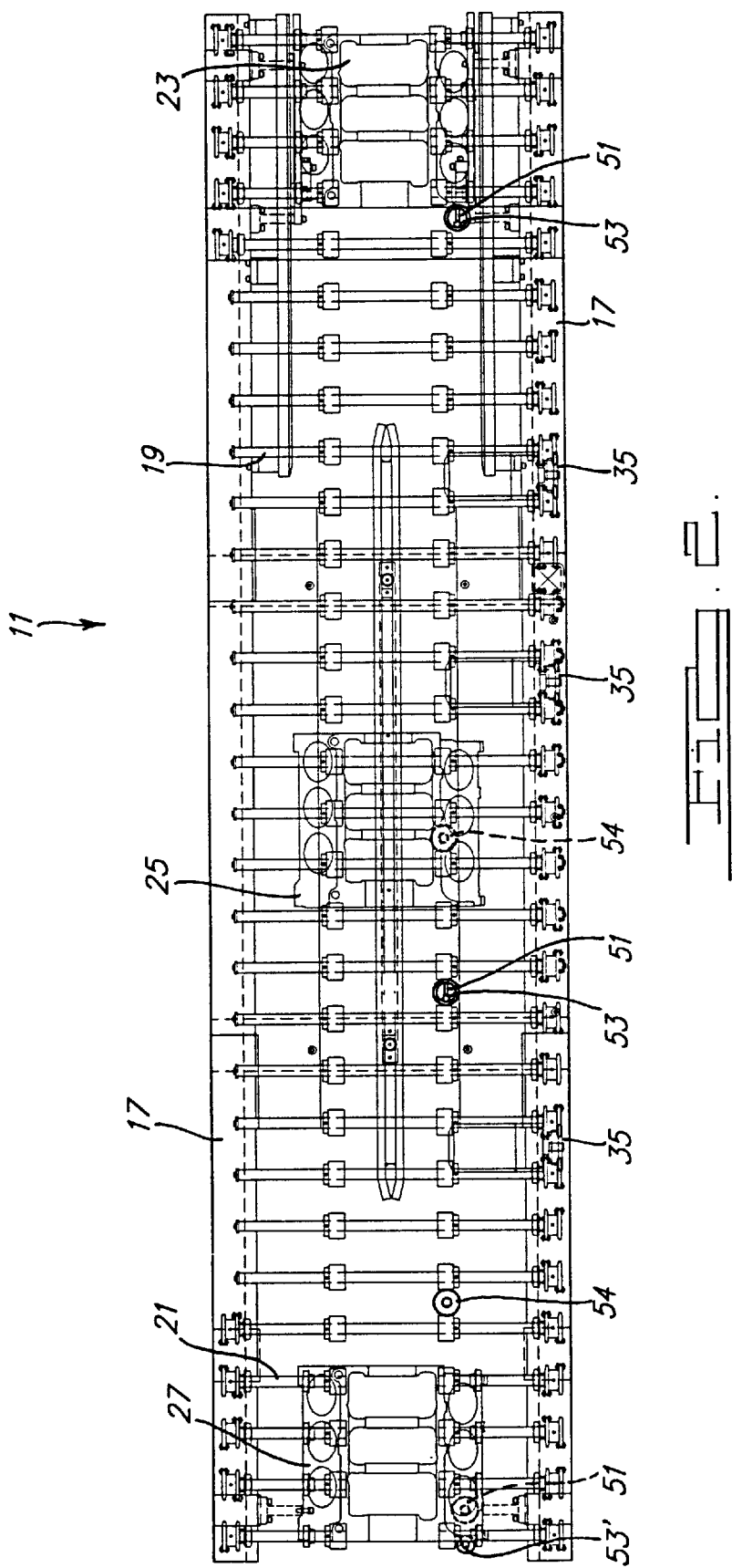
FIG. 2 is a diagrammatic top view showing the alternate embodiment accumulating power roll conveyor system.

FIGS. 1, 2 and 9 show an accumulating power roll conveyor system 11 of the present invention. Conveyor system 11 includes structural steel supports 13 affixed to a factory floor 15. Supports 13 are mounted to elongated and parallel side rails 17, between which are journalled a conveying surface consisting of multiple parallel and transversely oriented rollers 19. Rollers 19 are preferably constructed in accordance with U.S. Pat. No. 5,881,862 entitled "Torque Limiting Roller Drive for Conveyors" which issued to Fishaw on Mar. 16, 1999, and is incorporated by reference herein. Sets of shortened rollers 21 are also transversely mounted between side rails 17. These shortened rollers 21 provide a central opening located between coaxial pairs to allow for entry of a lifting member (not shown) which vertically rises from below the conveying surface for loading and unloading of parts 23, 25 and 27. The exemplary illustrated parts are internal combustion engine blocks, however, the present invention is equally applicable to other parts such as cylinder heads, transmission cases, or even parts transported within a container or pallet.

Conveyor system 11 is divided into three exemplary zones. Nevertheless, it should be appreciated that the present invention is equally applicable to any number of zones. Each zone has a power actuator system 31 which includes a 120 volt electric motor actuator 33, and a chain and sprocket transmission 35. A satisfactory motor 33 can be obtained from Bodine Corporation. All of rollers 19 and 21 within the corresponding zone are operably rotated at approximately the same speed when driven by the associated transmission 35 upon energization of motor 33. The rollers are all coupled to each other and transmission 35 by way of overlapping chain and sprocket arrangements. Each exemplary part sits upon and is operably moved by three rollers. Furthermore, each zone is typically one and one-half part lengths long to two and one-half part lengths along.

Referring to an alternate embodiment shown in FIGS. 1–3, zones 1 and 2 also include a mechanical switch 51 that is mounted to move with a corresponding movable stop 53. Mechanical switch 51 of zone 3 is physically separate from a stationary stop 53'. A longitudinally adjustable, supplemental mechanical switch 54 is provided in the middle of zones 2 and 3.

Referring to FIG. 7, each stop 53 of the alternate embodiment includes an elongated steel shot pin 55 which is movably located within a housing 57 located below rollers 19. A straight link 59 pivotally couples a distal end of pin 55 to an L-shaped link 61. An elbow of link 61 is pivotally coupled to a stationary bracket 63. A shaft 65 of a solenoid 67 is pivotally coupled to an end of link 61 opposite link 59. A magnetic plunger 69 is attached to an end of shaft 65 and is internally movable within wire windings 71. Thus, when windings 71 of solenoid 67 are energized, plunger 69 is linearly moved to compress a compression spring 73. This action linearly moves shaft 65 which, in turn, rotates linkages 59 and 61 from the advanced, over-center position shown on the right of FIG. 7 to the retracted, articulated condition shown on the left of FIG. 7. Thus, pin 55 is retracted from a part stopping position 75 to a clearance position 77. In other words, when in part stopping position 75, pin 55 is advanced vertically above the part transporting and conveying surface defined by the top of rollers 19 and 21. Parts 25 will then physically abut against pin 55 and thereby be prevented from further downstream movement until pin 55 is retracted below the conveying surfaces of rollers 19 and 21. The entire switch 51 moves with the section of stop 53 including pin 55.

The switch construction can best be observed by reference to FIGS. 3, 5, 6 and 8. Each of switches 51 and 54 is preferably a single pole, double throw, part present switch which includes an externally exposed member 91 coupled to a conductor 93 by way of a shaft 95. Depression of member 91 and shaft 95 causes an electrical connection between current carrying terminals within a double contact solenoid or the like. One satisfactory switch can be obtained from Square D Corporation, as part No. C54D. Switches 51 and 54 are push-push types of switches and member 91 may optionally be a roller ball journalled about an end of shaft 95. Accordingly, when part 23 physically contacts against member 91, member 91 and the associated conductor 93 will be depressed and complete, or alternately, break an already completed, electrical switch circuit. Thus, an electrical circuit 97 will remain in a changed signal state when part 23 remains in a contacting presence with member 91. Supplemental switch 54 is longitudinally adjustable depending on the length of the conveyed parts. It should be appreciated that toggle switches and switches having rotatable wiping contact arm members may also be employed. Furthermore, inductive proximity switches using magnetic fields may alternately be used with metallic parts 23, however, many of the circuitry advantages of the present invention will not be realized.

Figure 5:
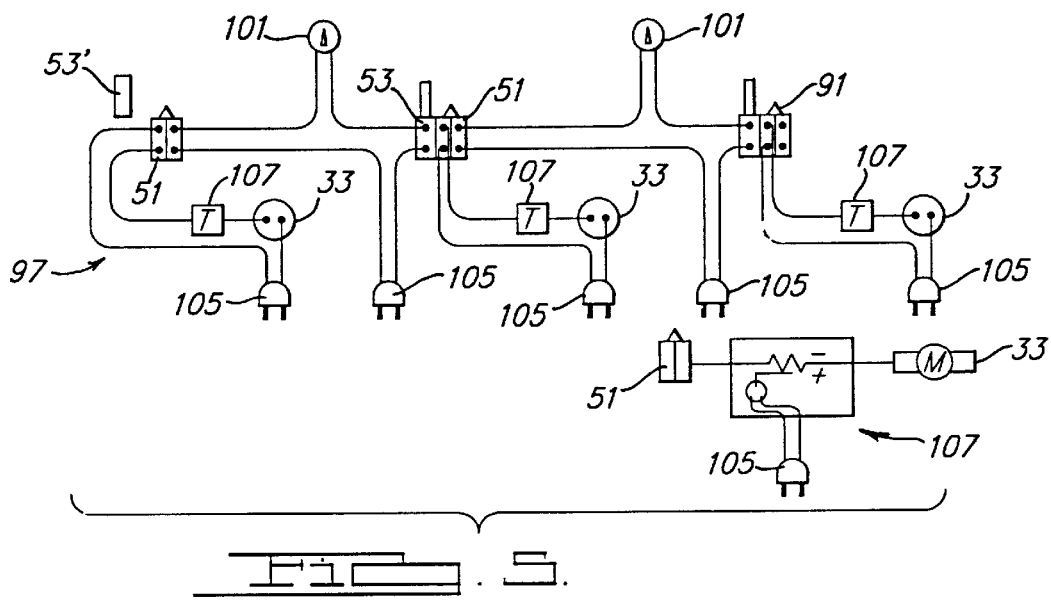
FIG. 5 is an electrical circuit diagram showing the alternate embodiment accumulating power roll conveyor system.
Figure 6:
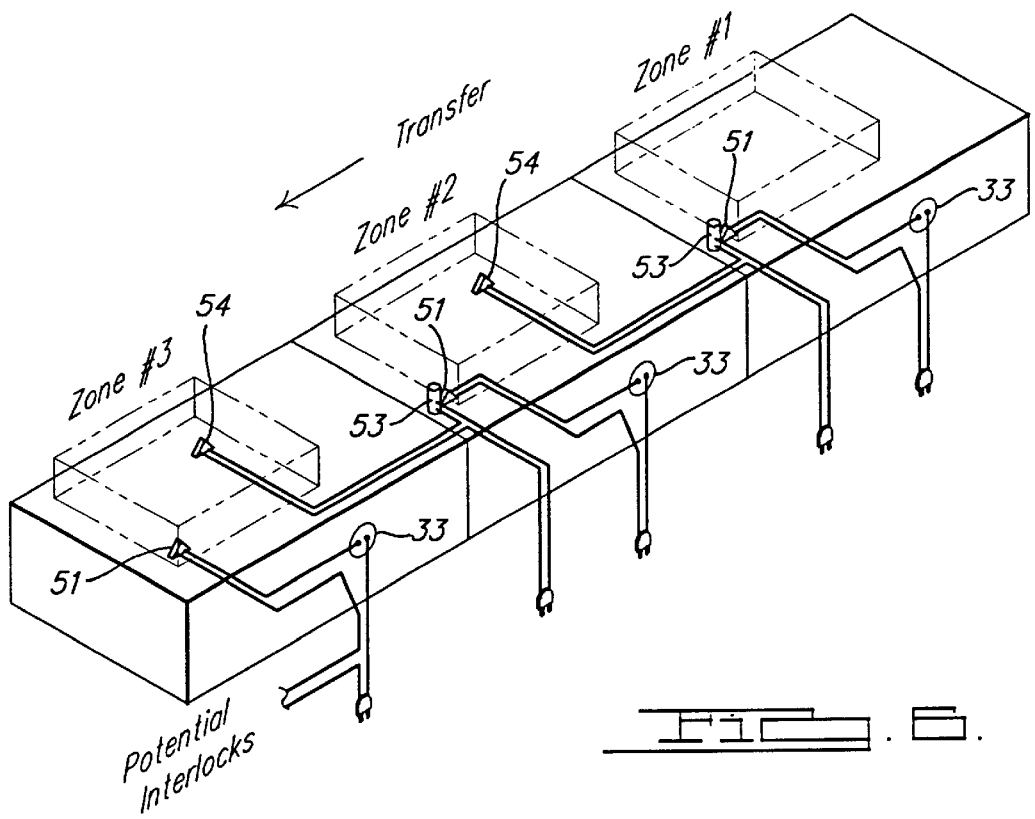
FIG. 6 is a diagrammatic perspective view showing an electrical circuit employed in the alternate embodiment accumulating power roll conveyor system.

FIGS. 5 and 6 show the circuit diagram for the alternate embodiment analog circuitry 97 of the present invention. For each of zones 1 and 2, switch 51 of the present zone and the downstream supplemental switch 54 are electrically connected to the solenoid of the present zonestop 53 which are, in turn, electrically connected to an operator actuable part loading and unloading switches 101 located on both sides of the conveyor. Electric motor actuators 33 are electrically connected to their respective switches 51 as are electrical plugs 105, indicative of a power supply (not shown). Timers 107 act to delay deenergization of each corresponding electric motor 33 by approximately one to five seconds from when electric switch 51 is initially contacted by a contacting part, if a part is also present in the downstream zone, as sensed by the downstream switch 51. This allows for hysteresis or part settling after a part rebounds or bounces back upstream a small distance after abutting against the associated stop 53. The delayed deenergization causes the rollers to continue driving the part to the contacting position immediately adjacent stop 53. Timer 107 can be variable potentiometer or the like.

The most downstream stop 53' can be fixed or stationarily bolted to side rail 17, as shown in FIGS. 1–3 and 5, or can be the automatically movable variety 53 depending on the subsequent downstream station, if any. It is significant that the zones employing the exemplary embodiment of the present invention conveyor do not use a programmable logic controller but instead use hard wiring, analog components and electromagnetic devices. Hence, movement of parts physically turns on and off mechanical switches which raise and lower plungers and the associated members with electromagnetic devices, such as solenoids, while also turning on and off motors for the corresponding zones. The electrical circuit of the present invention controls the preferred zones based on direct and discrete analog signals rather than digitized microprocessor or programmable logic controller signals.

Figure 4A:
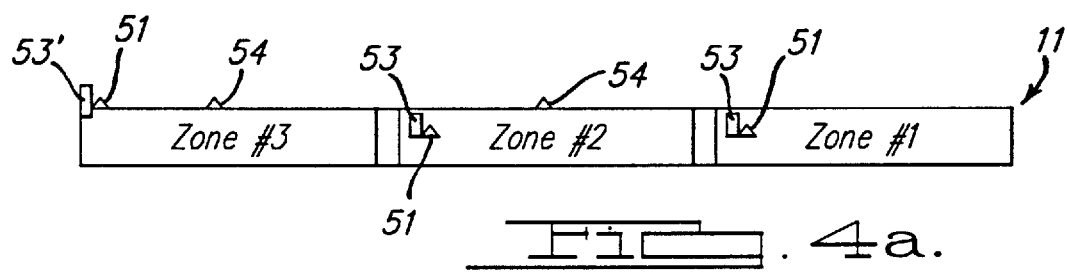
FIGS. 4a–4e are a series of diagrammatic flow charts showing the alternate embodiment accumulating power roll conveyor system with parts disposed in various locations.

FIGS. 4a–e illustrate the operational sequence and logic of accumulating power roll conveyor system 11 of the present invention. FIG. 4a shows no parts being present within zones 1, 2 and 3 of the conveyor. Accordingly, the contacting members of switches 51 and stop 53 within zones 1 and 2 are in automatically retracted orientations since supplemental switches 54 do not sense the presence of parts in zones 2 and 3; however, the zone 3 switch 51 is in an advanced position. Simultaneously, as long as the conveyor operator has turned on the part loading switch 101 (see FIG. 5), the electric motors corresponding with zones 1, 2 and 3 will all be energized to drive the corresponding rollers since the switches for each zone do not indicate the presence of parts therein.

Figure 4B:
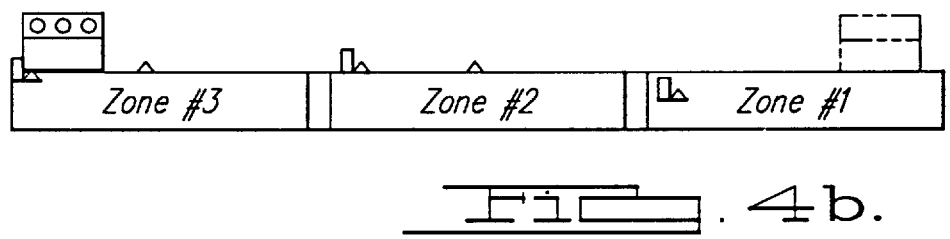

FIG. 4b illustrates a part being present in zone 3 where it is physically contacting against the zone 3 switch and physically abutting against zone 3 stop. Accordingly, the electric motor is deenergized for zone 3. Furthermore, the sensed presence of the part within zone 3 by switch 54 therein causes zone 2 stop 53 to be automatically placed in its advanced and part stopping position to prevent undesired movement of any parts from zone 2 to zone 3. The zones 1 and 2 electric motors are energized to transport the new entry part (shown in phantom) from zone 1 to zone 2 since the zone 1 and zone 2 switches are not being contacted by any parts; this condition also causes the zone 1 stop to be in its retracted orientation to allow transportation of the recently loaded part at the upstream end of zone 1.

Figure 4C:
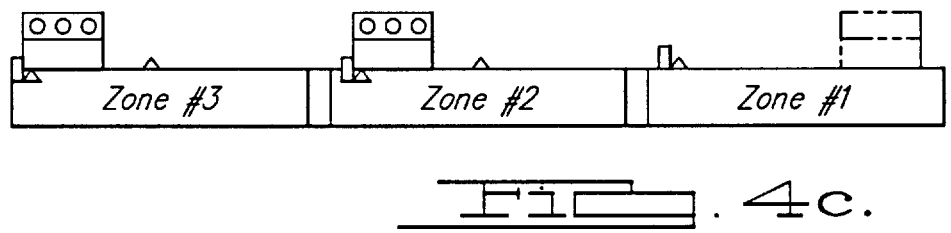

FIG. 4c illustrates similar conveyor system conditions for zones 2 and 3 wherein a part is contacting against each switch 51 and each advanced stop within zones 2 and 3. This causes deenergization of the electric motors for zones 2 and 3, and part sensing by zone 2 switch 54 automatically causes the advancement of stop 53 in zone 1 to prevent an upstream part therein (shown in phantom) from entering zone 2. The electric motor for zone 1 is energized to move the recently loaded part to the downstream end of zone 1 against the zone 1 stop since the zone 1 switch has not yet been contacted by the yet upstream part.

Figure 4D:
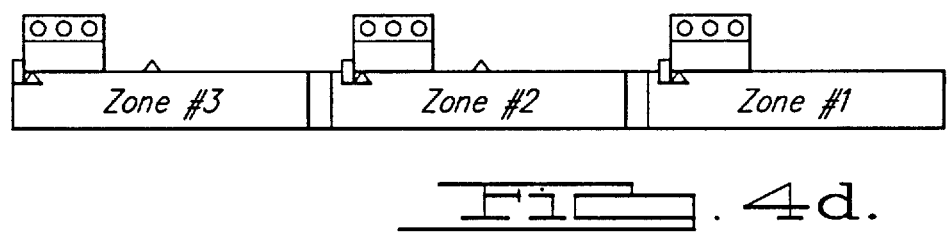
Figure 4E:
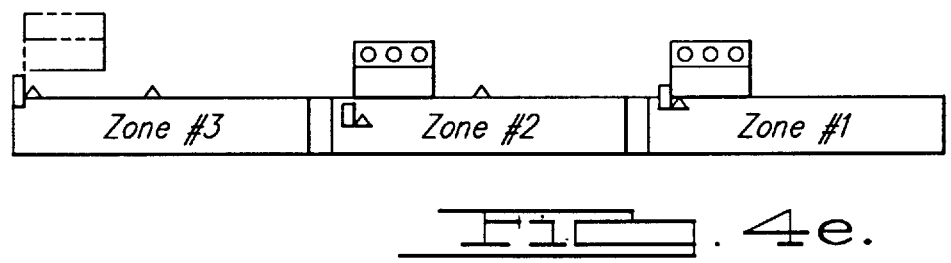

FIG. 4d illustrates similar conditions in all three zones wherein a part contacts each associated switch and stop. This causes deenergization of each zone electric motor in order to maintain the predetermined spacing between adjacent parts. Finally, FIG. 4e illustrates the removal of the zone 3 part by way of an overhead, scissor-tong hoist (not shown), underlying elevator-type walking beam member, robotic arm, or simply by retraction of the zone 3 stop and energization of the zone 3 motor allowing continued passage. Accordingly, since zone 3 switch 51 no longer senses the presence of a part, zone 2 stop 53 is automatically retracted and the zones 2 and 3 motors are automatically energized to transport the part presently in zone 2 to the downstream end of zone 3. Subsequently, once the zone 2 part has been transferred to zone 3, the zone 1 stop will be automatically retracted to allow the zone 1 part to move to the adjacent downstream zone 2 through zone 1 and zone 2 motor energization. The preceding zone stops will be advanced to part stopping orientations after the part has left that corresponding zone and been received in the adjacent downstream zone as sensed by downstream zone switch 54. Again, the present invention methodology achieves an orderly and spaced progression of parts in an accumulating manner and in a much more cost effective, non-programmable logic controller system.

Figure 10:
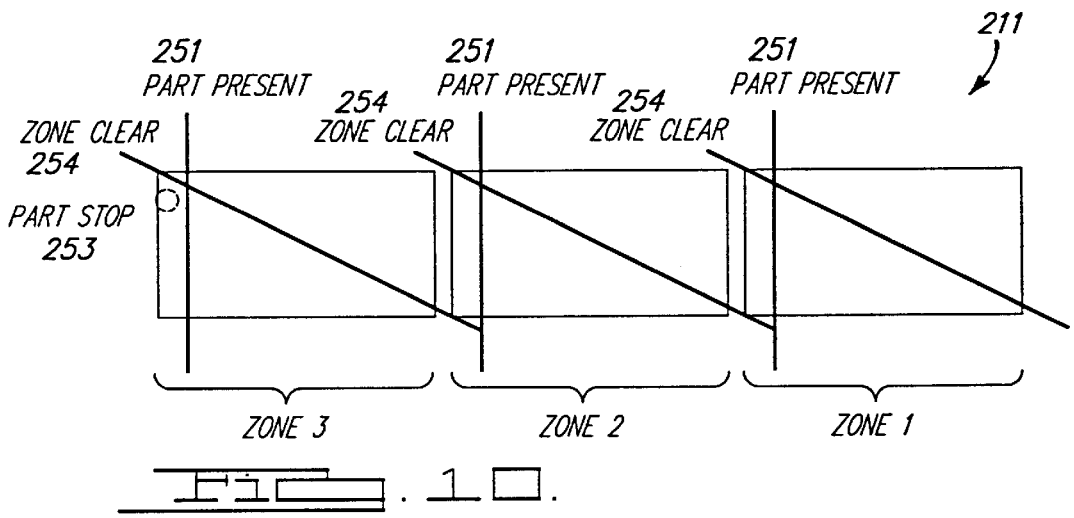
FIG. 10 is a diagrammatic top view showing the preferred embodiment accumulating power roll conveyor system.

The preferred embodiment of an accumulating power roll conveyor system 211 of the present invention is shown in FIGS. 9 and 10. This embodiment is similar to the previously described one except that the presently preferred embodiment employs PEC photo-electric eye sensor switch or sensors instead of physically contactable mechanical switches. Also, physical part stops are not required for each zone. Notwithstanding, the preferred embodiment system does not require the use of an expensive programmable logic controller.

More specifically, a transversely sensing, part present optical switch or sensor 251, and an upstream, diagonally sensing, zone clear optical switch or sensor 254 are located in each zone. Optical sensors 251 and 254 are electrically connected to electric motor actuators 33 and a zone 3 solenoid-retractable mechanical part stop 253, through junction boxes 281, 282 and 283, associated with zones 1, 2 and 3, respectively. Each part present optical sensor 251 is preferably a dark sensing through beam which can be obtained from Square D Corporation as part No. XU2M18MA230K. Each zone clear optical sensor 254 is preferably a light sensing through beam which can be obtained from Square D Corporation as part No. XU2M18MB230K; of course, different sensors can be used. The optical sensors are stationarily mounted to side rails 17 or the like.

Figure 11A:
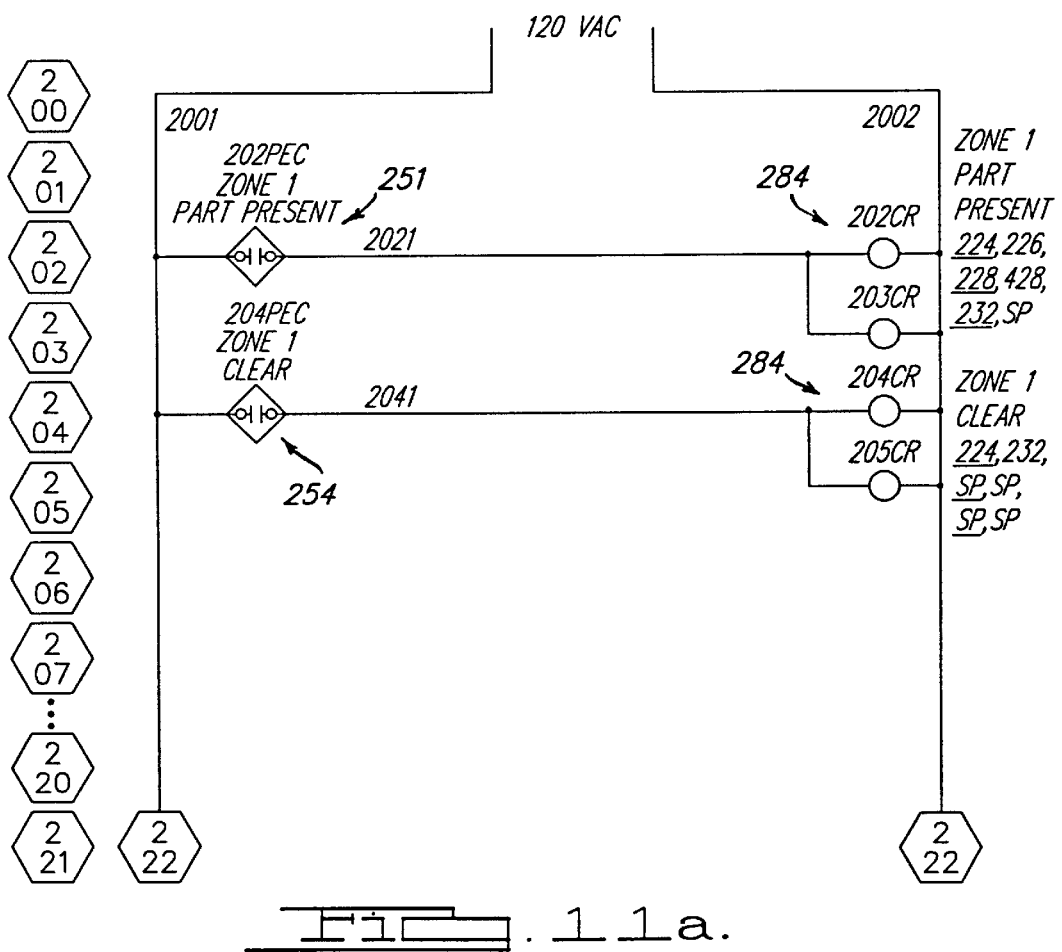
FIGS. 11a–11i are electrical circuit diagrams showing the preferred embodiment accumulating power roll conveyor system.
Figure 11B:
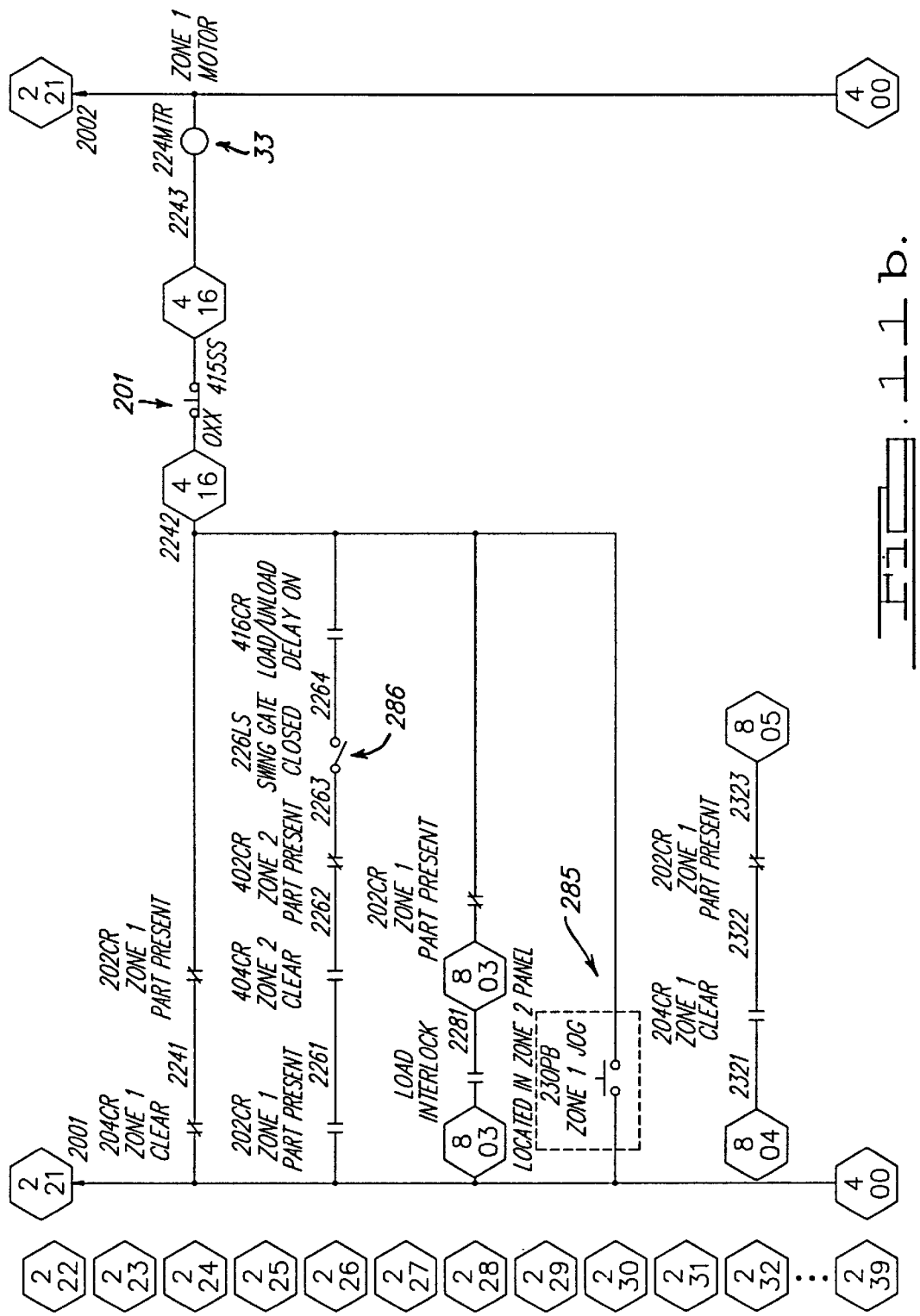

The preferred embodiment circuit diagram will now be discussed in detail. The electrical circuitry is of a hard-wired analog type, but can alternately be on a printed circuit board. No programmable logic control is needed, however. FIG. 11a illustrates zone 1 part present sensor 251, zone 1 zone clear sensor 254 and corresponding relays 284. Furthermore, FIG. 11b shows a load/unload switch 201 which is located in zone 2 but runs zone 1 motor 33. A manually operable zone 1 Jog switch 285 and swing gate closed switch 286 are employed. The swing gate is a manually movable section of the conveyor which can be rotated about a floor-mounted post to allow a person to pass from one side of the conveyor to the other. Swing gate switch 286 sends a signal or completes the circuit indicative of when the swing gate is closed to allow energization of that portion of the conveyor line.

Figure 11C:
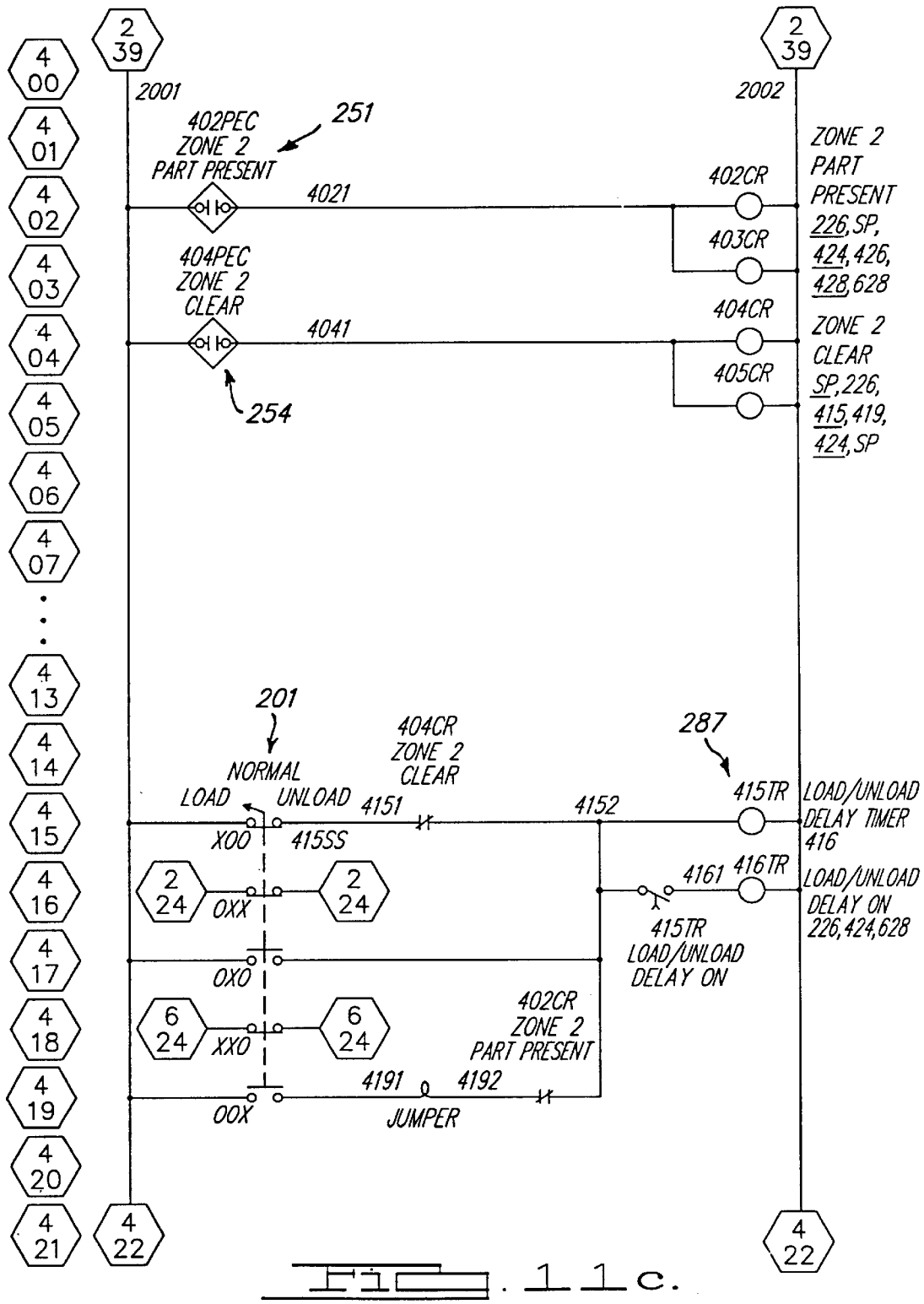
Figure 11D:
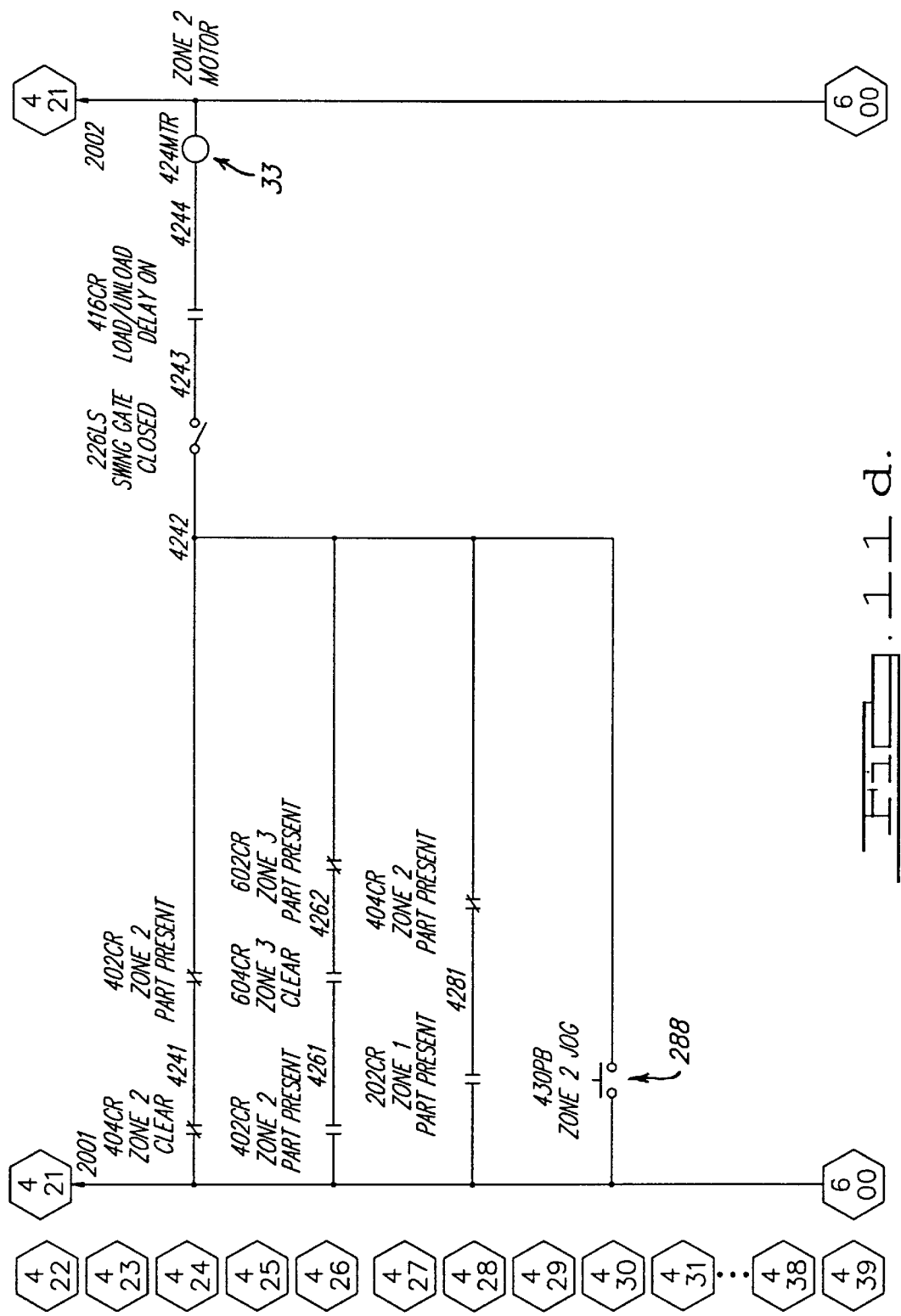
Figure 11E:
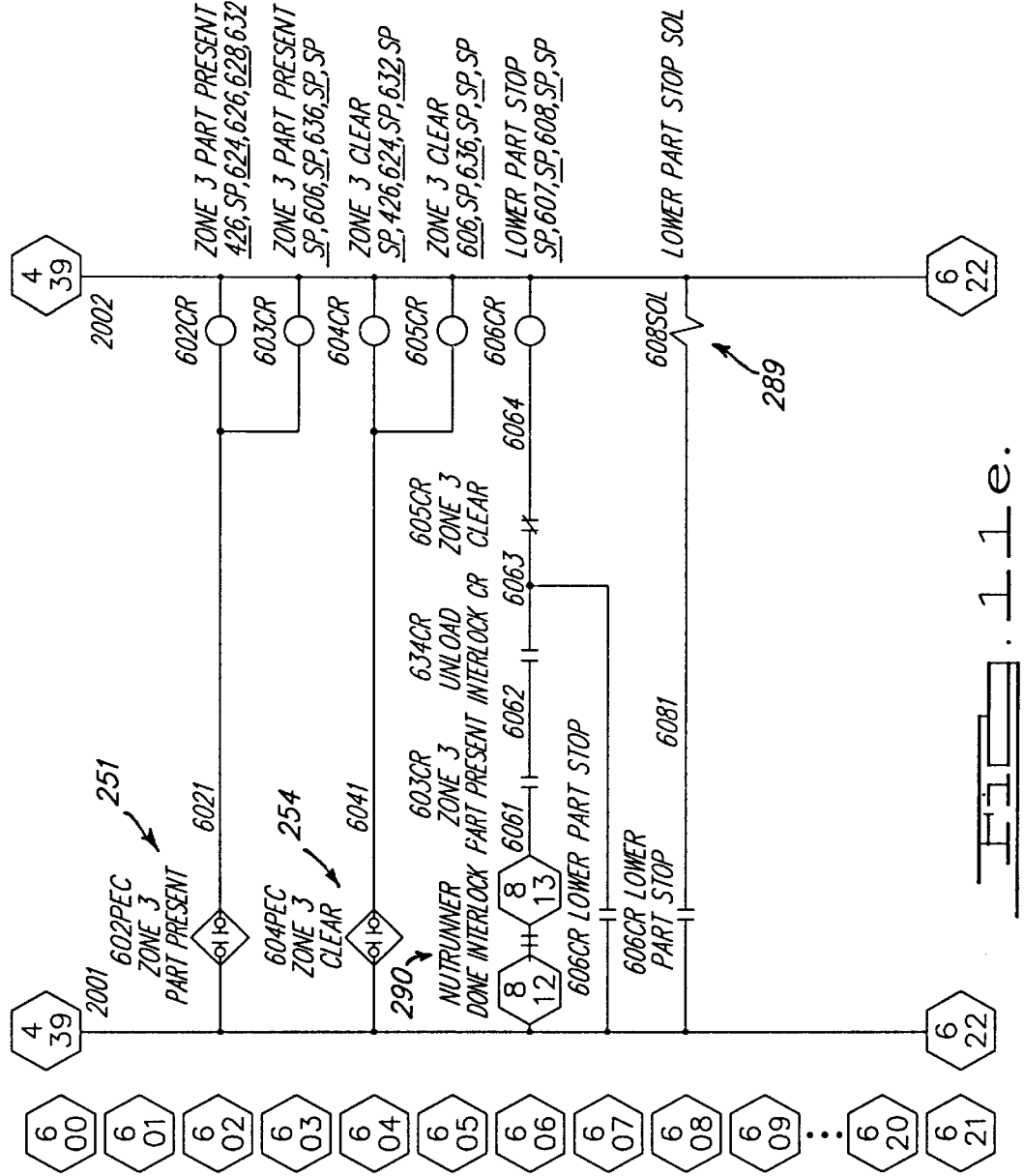

FIG. 11c shows zone 2 part present and zone clear sensors, respectively 251 and 254. Zone 2 load/unload switches 201 and delay timers 287 are also used. The zone 2 motor 33 and a Jog switch 288 are included in FIG. 11d. Moreover, FIG. 11e illustrates the zone 3 part present sensor 251 and zone clear sensor 254 as well as a solenoid 289 for part stop 253. Circuitry for a nutrunner machine 290 (see also FIGS. 9 and 11c) interfaces with the conveyor circuitry. Nutrunner machine 290 has multiple spindles, driven by brushless motors and a solid-state controller. The spindles are operable to tighten threaded fasteners on the conveyed part in zone 3. It should be appreciated, however, that other machine tools, inspection devices and material treating equipment can be used instead of the exemplary nutrunner.

Figure 11F:
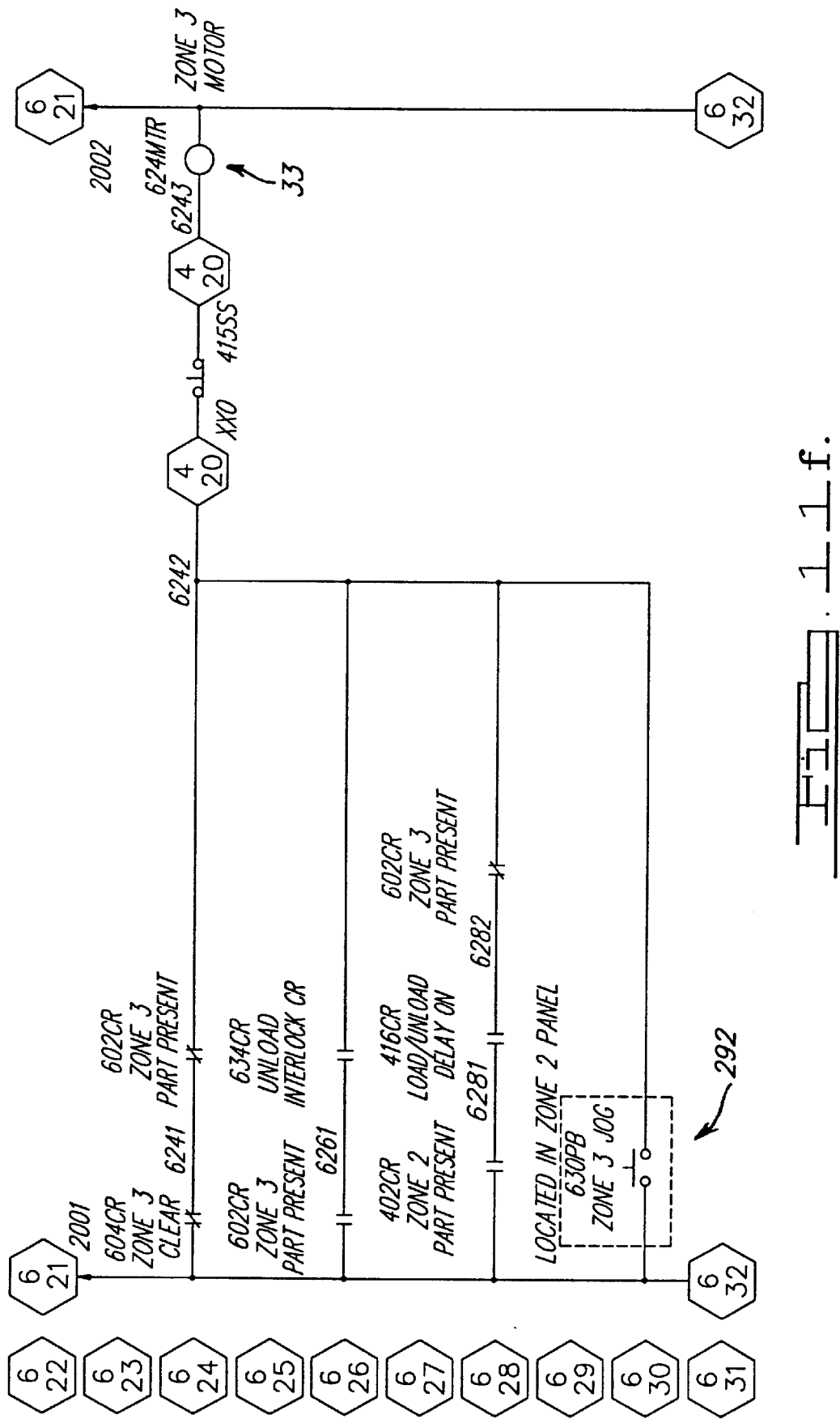
Figure 11G:
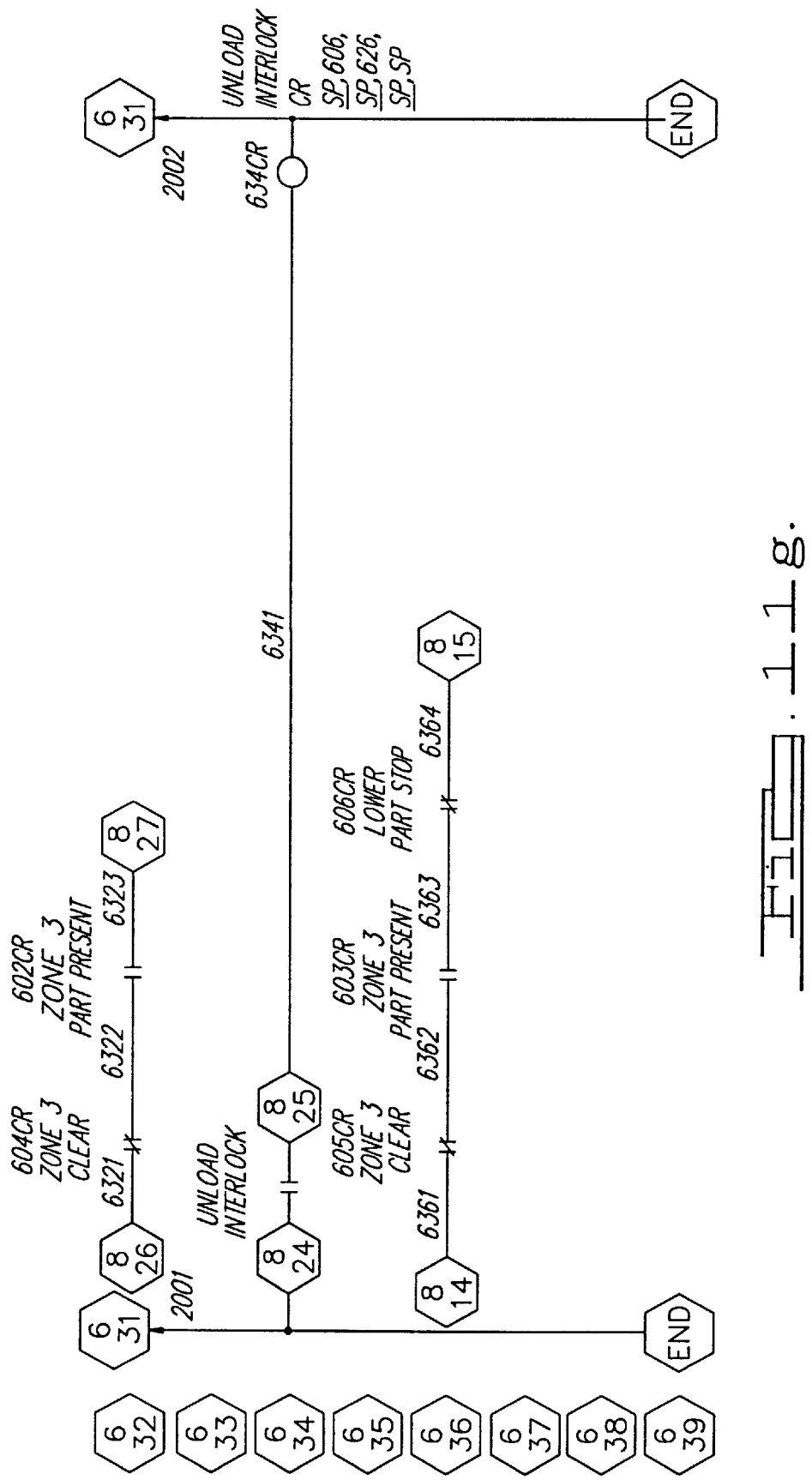
Figure 11H:
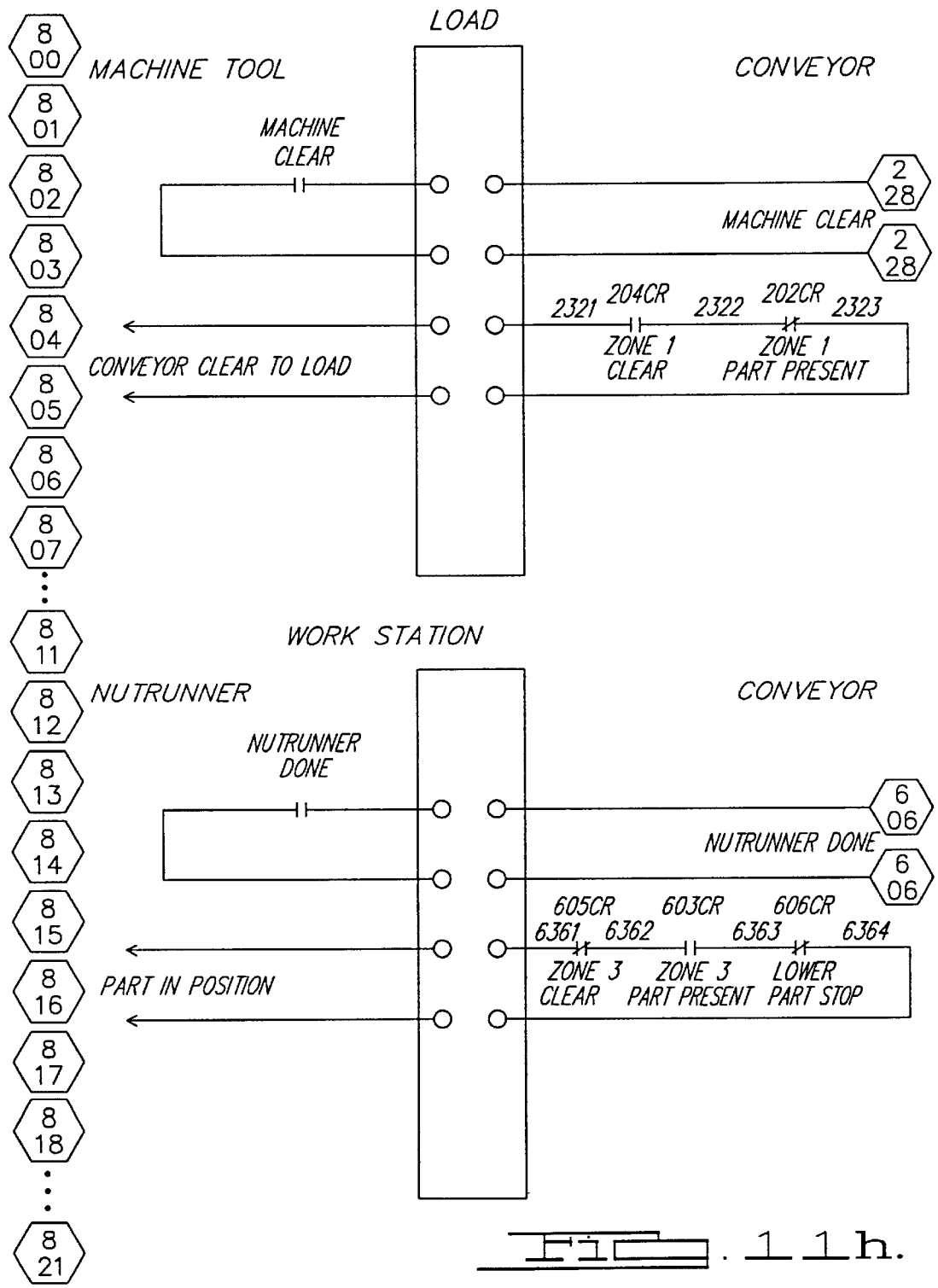
Figure 11I:
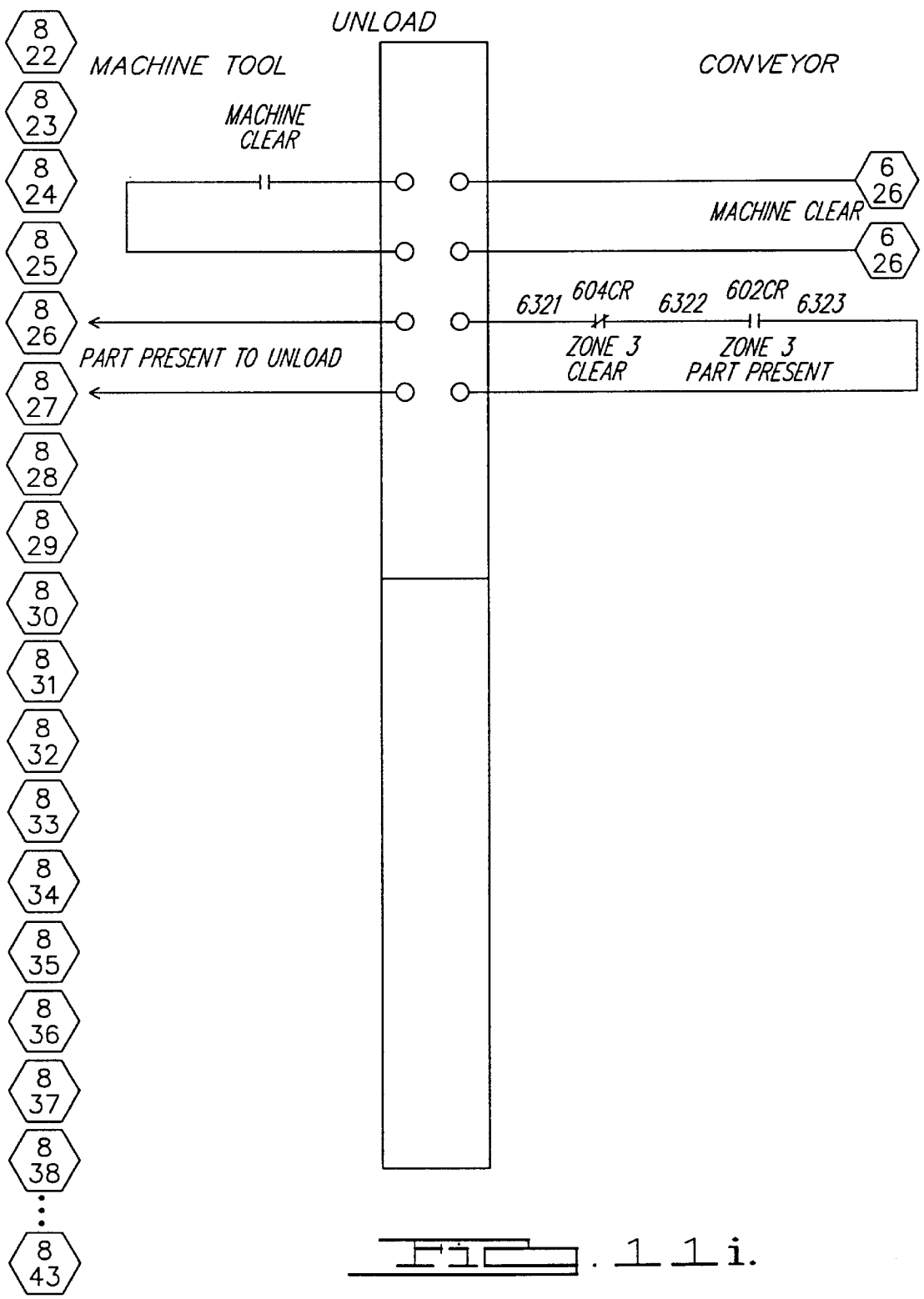
Figures 12A, 12B:
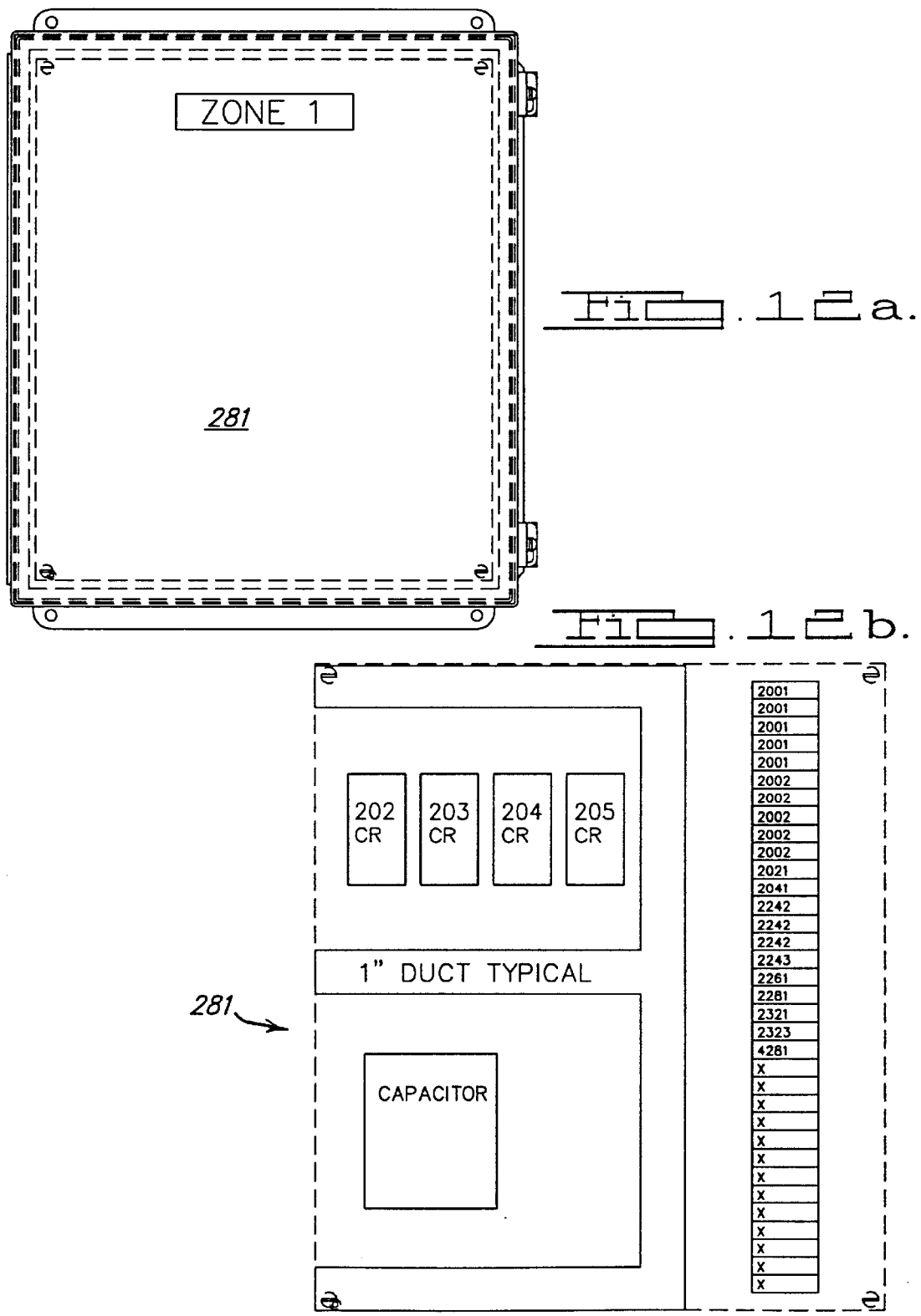
FIG. 12a is a side elevational view showing a zone 1 junction box employed in the preferred embodiment accumulating power roll conveyor system.
FIG. 12b is a diagrammatic side view showing the internal componentry of the zone 1 junction box employed in the preferred embodiment accumulating power roll conveyor system.
Figure 13A:
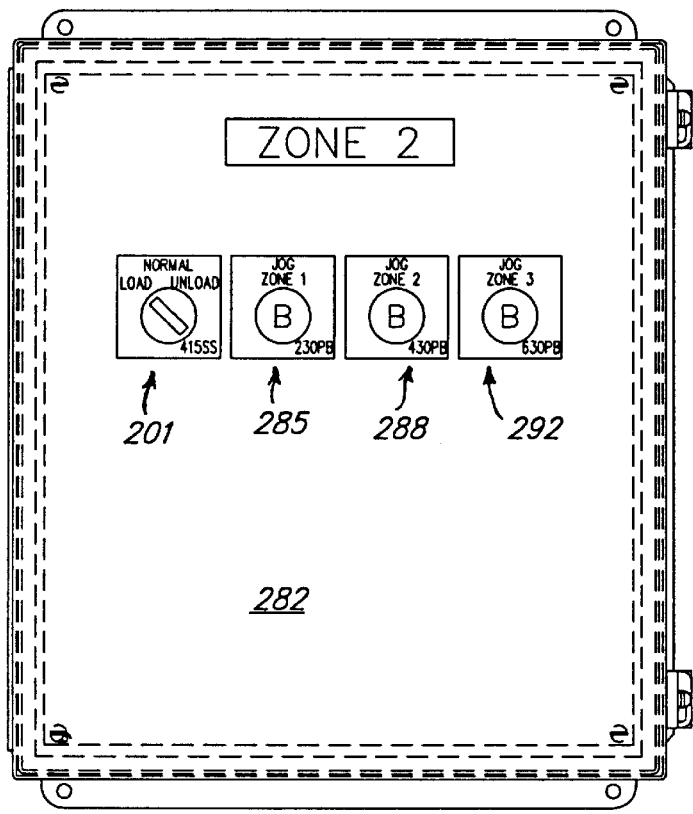
FIG. 13a is a side elevational view showing the zone 2 junction box employed in the preferred embodiment accumulating power roll conveyor system.
Figure 13B:
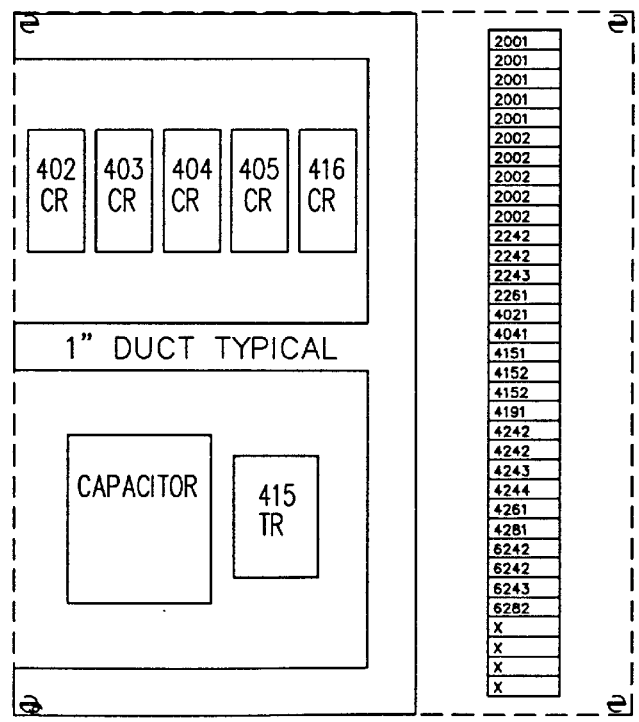
FIG. 13b is a diagrammatic side view showing the internal componentry of the zone 2 junction box employed in the preferred embodiment accumulating power roll conveyor system.

The zone 3 motor 33 and a zone 3 Jog switch 292 are also employed and shown in FIG. 11f. FIG. 11h shows the part loading circuitry and FIG. 11i shows the part unloading circuitry; a walking beam, gantry, articulated robot or additional upstream/downstream conveyors provide the machine clear signals. FIGS. 12a and 12b illustrate zone 1 junction box 281, FIGS. 13a and 13b illustrate zone 2 junction box 282 and FIGS. 14a and 14b illustrate zone 3 junction box 283. Circuit numbers 2000–2999 are power terminals, with 2001 as positive and 2002 as ground. Circuit numbers 4000–4999 are zone 2 terminals. Circuit numbers 6000–6999 are zone 3 terminals. Furthermore, zone 2 junction box 282 contains externally accessible load/unload switch 201 and zone Jog switches 285, 288 and 292, which are manually actuable by the conveyor operator. The Jog switches allow the operator to manually override the automatic control system. The following electric components are preferably as follows, however, other suppliers and components can be used: the plug in relay can be obtained as part No. 700-HA33A1 from Allen Bradley; the relay base, plug in timer and timer base can be obtained as part Nos. 700-HN101, 700-HT12AA1 and 700-HN100, respectively, from Allen Bradley; 1492-CA1 terminals, 800T-J2KE7C selector switches and 800T-A1D1 pushbuttons can be purchased from Allen Bradley; Hoffman A-16148CH junction boxes and A-16P14 Hoffman backplates can be employed; microcords can be obtained from Lumberg as RKWT3U-618/20; and Panduit grey round hole ducts and covers can be used.

The preferred embodiment system operates as follow. First, if no parts are sensed in any zones from any of the optical sensors, the corresponding load interlock relays send a signal that no parts are present and the zone 1 electric motor is energized to drive the zone 1 rollers. Secondly, if a part is present on the upstream end of zone 1, the zone clear optical sensor in zone 1 sends a signal but the zone 1 part present optical sensor does not send a signal; this condition causes the zone 1 motor to remain energized.

Thirdly, if the zone 1 part present sensor sends a signal indicating a part at the downstream end of zone 1, if the zone 2 zone clear sensor indicates that no part is anywhere in zone 2, then the zone 1 motor remains energized. Fourthly, if no part is sensed in zone 2 by the zone 2 part present sensor, and the zone 2 zone clear sensor indicates a part moving into zone 2 from zone 1, then the zone 2 motor is energized and the zone 1 motor is deenergized. This automatically causes part stripping or destacking to space apart adjacent parts if two are inadvertently in the same zone (for example, through manual operator compression of parts).

Fifthly, the zone 1 motor will reenergize until the part in zone 1 reaches the zone 1 part present sensor, but after the part in zone 2 reaches the zone 2 part present sensor, at which point both motors will be deenergized. The zone 2-to-zone 3 conveyor interaction is the same as for that between zones 1 and 2, except that a physically contacting movable stop pin is also used at the downstream end as was described with the alternate embodiment. A mechanical anti-backup lever or wedge-angled, solenoid movable stop (not shown) can additionally be provided to ensure precise positioning of the part in zone 3 for supplemental nutrunning, machining or other operations. The preferred embodiment system advantageously saves power consumption by causing the zone motors to remain deenergized until a part is sensed entering the corresponding zone. The destacking feature with a non-PLC control system is also a significant piece cost savings.

While the preferred embodiment of the accumulating power roll conveyor system of the present invention has been disclosed, it will be appreciated that various alterations can be made. For example, hydraulic or other fluid actuators can be used instead of the disclosed electric motor and chain transmission actuator system. Furthermore, the switch and stop positioning can be varied to allow for horizontal or angular advancement and retraction. Also, the stop can employ a rotary part contacting member rather than the preferred linearly movable member. Also, various other linkages and couplings can be employed to move the stop. Moreover, a fiberoptic circuit can also be substituted for the hard electrical wires disclosed. In another alternate variation, the switch can be placed slightly upstream from the stop within the same zone. In another embodiment, the present invention zones each using mechanical switches and stops can also be employed in combination with adjacent zones using photo electric sensors and programmable logic controllers. It is also envisioned that the three illustrated zones can be adjacent to an intermediate operation station, such as a part inspection station, a part washing station, an assembly station or the like, and then another one or two zones of the present invention can be provided on the opposite or downstream side of such an intermediate station. Finally, a belt part transporting surface can replace or be added to the preferred rollers for some lighter weight applications. While various materials have been disclosed, it should be appreciated that other materials may be employed. It is intended by the following claims to cover these and any other departures from the disclosed embodiments which fall within the true spirit of this invention.

The invention claimed is:

1. An accumulating power roll conveyor comprising:
   a first zone including a first set of rollers, a first actuator operably driving the first rollers, and a first part sensing member electrically connected to the first actuator;
   a second zone including a second set of rollers, a second actuator operably driving the second rollers, and a second part sensing member electrically connected to the second actuator;
   a third zone including a third set of rollers, a third actuator operably driving the third rollers, and a third part sensing member electrically connected to the third actuator; and
   a control circuit controlling the part sensing members and actuators based only on analog signals free of a programmable logic controller and free of a microprocessor;
   the second zone being located downstream of the first zone and the third zone being located downstream of the second zone.

2. The conveyor of claim 1 further comprising:
   first, second and third automatically movable stops located in the first, second and third zones, respectively;
   the first, second and third actuators being energized and the first and second stops being retracted to non-part stopping positions if the first, second and third part sensing members indicate that no part is substantially present in the first, second and third zones;
   the first and second actuators being energized, the third actuator being deenergized, the first stop being retracted, and the second and third stops being advanced to part stopping positions if the third part sensing member indicates that a part is present in the third zone, and the first and second part sensing members do not indicate substantial presence of parts in their respective zones;
   the third actuator being deenergized, the third stop being advanced, the second actuator being deenergized, the second stop being advanced, the first actuator being energized and the first stop being advanced if a part physically contacts against the third part sensing member, the part physically contacts against a second part sensing member and no part physically contacts against the first part sensing member;

the third actuator being deenergized, the third stop being advanced, the second actuator being deenergized and the second stop being advanced, the first actuator being deenergized and the first stop being advanced if a part physically contacts against each of the part sensing members; and the second and third actuators being energized and the second stop being retracted if the third part sensing member is not physically contacted by a part, the second part sensing member is being physically contacted by a part and the first part sensing member is physically contacted by a part.

3. The conveyor of claim 1 wherein the part sensing member is an optical sensor.

4. An accumulating power roll conveyor comprising:
a first zone including a first set of rollers, a first actuator operably driving the first rollers, and a first part sensing member electrically connected to the first actuator;
a second zone including a second set of rollers, a second actuator operably driving the second rollers, and a second part sensing member electrically connected to the second actuator;
a third zone including a third set of rollers, a third actuator operably driving the third rollers, and a third part sensing member electrically connected to the third actuator;
a control circuit controlling the part sensing members and actuators based only on analog signals;
the second zone being located downstream of the first zone and the third zone being located downstream of the second zone;
a diagonally sensing zone clear sensor located in each zone and electrically connected to each corresponding actuator;
each part sensing member transversely sensing a part adjacent a downstream end of the corresponding zone.

5. The conveyor of claim 4 wherein the analog electric circuit is hard-wired and free of a programmable logic controller.

6. The conveyor of claim 1 wherein the actuators are electric motors.

7. An accumulating power roll conveyor comprising:
a first zone including a first set of rollers, a first actuator operably driving the first rollers, and a first pail sensing member electrically connected to the first actuator;
a second zone including a second set of rollers, a second actuator operably driving the second rollers, and a second part sensing member electrically connected to the second actuator;
a third zone including a third set of rollers, a third actuator operably driving the third rollers, and a third pail sensing member electrically connected to the third actuator; and
a control circuit controlling the part sensing members and actuators based only on analog signals;
the second zone being located downstream of the first zone and the third zone being located downstream of the second zone;
wherein the part sensing members are mechanical switches which are physically contactable by a passing conveyed part.

8. The conveyor of claim 1 wherein adjacent parts are longitudinally separated from each other by controlling energization and deenergization of the actuators and rollers in adjacent of the zones.

9. An accumulating power roll conveyor comprising:
a first zone including a first set of rollers, a first actuator operably driving the first rollers, and a first part sensing member electrically connected to the first actuator;
a second zone including a second set of rollers, a second actuator operably driving the second rollers, and a second part sensing member electrically connected to the second actuator;
a third zone including a third set of rollers, a third actuator operably driving the third rollers, and a third part sensing member electrically connected to the third actuator; and
a control circuit controlling the part sensing members and actuators based only on analog signals;
the second zone being located downstream of the first zone and the third zone being located downstream of the second zone;
wherein adjacent parts are longitudinally separated from each other by controlling energization and deenergization of the actuators and rollers in adjacent of the zones; and
wherein adjacent parts are destacked from each other by controlling energization and deenergization of the actuators and rollers in adjacent of the zones, if more than one of the parts is inadvertently moving in a single one of the zones.

10. The conveyor of claim 9 wherein at least one of the part sensing members is an optical sensor.

11. The conveyor or claim 10 further comprising:
a diagonally sensing zone clear sensor located in each zone and electrically connected to each corresponding actuator; and
each part sensing member transversely sensing a part adjacent a downstream end of the corresponding zone.

12. The conveyor of claim 9 wherein the analog electric circuit is hard-wired and free of a programmable logic controller and free of a microprocessor.

13. The conveyor of claim 9 wherein the actuators are electric motors.

14. The conveyor of claim 9 wherein the part sensing members are mechanical switches which are physically contactable by a passing conveyed part.

15. An accumulating power roll conveyor for transporting parts, the conveyor comprising:
an actuator system;
part transporting surfaces operably driven by the actuator system, the surfaces being separated into at least a first zone and a second zone, the surface in the first zone being driven mechanically independently from the surface in the second zone;
a first electrical switch located adjacent the first zone, the first switch being adapted for physical contact by one of the parts if the part is present in the first zone;
a second electrical switch located adjacent the second zone, the second switch being adapted for physical contact by at least one of the parts if the part is present in the second zone; and
a first automatically movable stop electrically connected to the first and second switches, the first stop being adapted to physically abut against and stop movement of one of the parts from moving from the first zone to the second zone if the second switch indicates that a second of the parts is present in the second zone;

the stop being automatically retractable to allow the first part to be transported from the first zone to the second zone if the first switch indicates that the first part is substantially present in the first zone and the second switch indicates that none of the parts are substantially present in the second zone.

16. The conveyor of claim 15 further comprising:

the surfaces being further separated into a third zone downstream of the second zone which is downstream of the first zone; and a third switch located adjacent the third zone, the third switch being adapted for physical contact by one of the parts if the part is present in the third zone;

the actuator system being energized to drive the surfaces in the first, second and third zones if the second and third switches indicate that none of the parts are substantially present in the second and third zones respectively, and if the first switch indicates that one of the parts is present in the first zone.

17. The conveyor of claim 16 further comprising:

a second automatically movable stop electrically connected to the second and third switches;

the second stop being adapted to physically abut against and stop movement of the second part from moving from the second zone to the third zone if the third switch indicates that a third of the parts is present in the third zone.

18. The conveyor of claim 17 wherein the first and second stops are automatically retracted and the first, second and third surfaces are automatically driven to move one of the parts from the first zone, to the second zone and then to the third zone, if the second and third switches indicate that none of the parts are substantially present in the second and third zones.

19. The conveyor of claim 15 wherein the first switch causes the actuator system to drive the surface in the first zone if the second switch indicates that none of the parts are substantially present in the second zone.

20. The conveyor of claim 19 wherein the first switch causes the actuator system to discontinue driving the surface in the first zone if the second switch indicates that one of the parts is present in the second zone.

21. The conveyor of claim 15 wherein the actuator system includes:

a first electric motor and a first transmission coupled to the surface in the first zone; and a second electric motor and a second transmission coupled to the surface in the second zone.

22. The conveyor of claim 15 wherein the parts are automotive vehicle powertrain parts operably transported by the surfaces.

23. The conveyor of claim 15 further comprising an analog electrical circuit connecting and controlling the actuator system, the switches and stop by use of direct analog signals and free of a programmable logic controller.

24. The conveyor of claim 15 wherein the surfaces include rotatable rollers.

25. The conveyor of claim 15 further comprising a part inspection station located at the first zone.

26. The conveyor of claim 15 further comprising a part unloading station located at the second zone.

27. The conveyor of claim 15 further comprising a second automatically movable stop adapted to physically abut against and stop movement of the second part when the second part is present in the second zone.

28. An accumulating power roll conveyor for transporting parts, the conveyor comprising:

a first part present switch;

a second part present switch located downstream of the first switch;

a third part present switch located downstream of the second switch;

a first movable stop located downstream of the first switch and upstream of the second switch;

a second movable stop located downstream of the second switch and upstream of the third switch;

physical contact against the third switch operably causing the second stop to be automatically placed in a part stopping position, withdrawal of the physical contact against the third switch operably causing the second stop to be withdrawn from the part stopping position;

physical contact against the second switch operably causing the first stop to be automatically placed in a part stopping position, withdrawal of the physical contact against the second switch operably causing the first stop to be withdrawn from the part stopping position.

29. The conveyor of claim 28 further comprising:

a first actuator system;

a first part transporting surface operably driven by the first actuator system, the first surface being located substantially upstream of the first stop;

a second actuator system energizable mechanically independent of the first actuator system; and a second part transporting surface operably driven by the second actuator system, the second surface being located substantially between the first and second stops.

30. The conveyor of claim 29 further comprising:

a third stop operable to physically abut against at least one of the parts;

a third actuator system energizable mechanically independent of the first and second actuator systems; and a third part transporting surface operably driven by the third actuator system, the third surface being located substantially between the second and third stops.

31. The conveyor of claim 29 wherein the first and second actuator systems each include an electric motor, and the first and second part transporting surfaces each include a set of rotatable rollers.

32. The conveyor of claim 29 wherein the first and second actuator systems cause the part to move from the first zone to the second zone, if the first switch is physically contacted to indicate that at least one of the parts is substantially present on the first part transporting surface, and the second switch has not been physically contacted by at least one of the parts to indicate that a part is not substantially present on the second part transporting surface.

33. The conveyor of claim 29 wherein the first actuator system is energized, the second actuator system is deenergized and the first stop is advanced to its part stopping position if the first switch does not indicate presence of a part in an adjacent first zone and the second switch indicates presence of a part in an adjacent second zone.

34. The conveyor of claim 28 wherein at least one of the stops includes a solenoid.

35. The conveyor of claim 34 wherein at least one of the stops includes a shot pin and a linkage mechanism, and the linkage mechanism movably couples the shot pin to the solenoid.

36. The conveyor of claim 28 further comprising:

a set of rollers; and an actuator operably driving the rollers;

the actuator remaining energized for a predetermined period of time before automatic deenergization after the corresponding switch is physically contacted by one of the parts if the corresponding stop is located in its part stopping position, in order to ensure physical contact of a part against the corresponding stop in the event that the part has rebounded upstream after initial contact with the corresponding stop.

37. The conveyor of claim 28 wherein at least one of the switches is depressed at or below a part transporting plane when physically depressed by contact with at least one of the parts.

38. The conveyor of claim 28 wherein at least one of the switches includes an annular member adapted for rotatable contact by a moving one of the parts.

39. The conveyor of claim 28 wherein the switches and stops substantially define separately energizable zones each having accumulating power rollers.

40. The conveyor of claim 28 wherein the switches and stops are part of an analog electrical circuit connecting and controlling the switches and stop by use of direct analog signals, and free of a programmable logic controller and free of a microprocessor.

41. An accumulating power roll conveyor control system for conveying parts, the control system comprising:

a first analog circuit including a first optical switch, a second switch and a first roller actuator;

a second analog circuit including a third optical switch, a fourth switch and a second roller actuator; and a third analog circuit including a fifth optical switch, a sixth switch and a third roller actuator;

wherein if the first switch indicates that the presence of a leading one of the parts has been sensed, and if the second switch does not indicate that the leading part is present, then the first actuator is energized;

wherein if the fourth switch indicates the presence of a trailing one of the parts then the second actuator is deenergized; and wherein if the fourth switch indicates the presence of the leading part, and if the second switch indicates the presence of the trailing part, then the first and second actuators are deenergized.

42. The control system of claim 41 wherein the actuators are electric motors, and at lest one of the circuits and at least one of actuators act to strip adjacent parts if more than one of the parts is inadvertently present in the same zone.

43. The control system of claim 41 wherein at least one of the second, fourth and sixth switches are optical sensors.

44. The control system of claim 41 wherein at least one of the second, fourth and sixth switches include a mechanical switch member physically contactable by the parts.

45. The control system of claim 41 wherein adjacent of the parts are longitudinally separated from each other by controlling energization and deenergization of adjacent of the actuators.

46. The control system of claim 41 wherein the actuators operably cause actuation of at least three adjacent conveying zones, each having sets of rotatable rollers which directly contact against the parts.

47. A method of operating an accumulating power roll conveyor having at least three zones with each zone having a set of rollers, an actuator, a switch and a stop, the method comprising:

(a) energizing the first, second and third actuators, and rotating the corresponding rollers, if the first, second and third switches indicate that no part is substantially present in the first, second and third zones;

(b) automatically moving the first and second stops to allow passage of parts past the first and second stops if the first, second and third switches indicate that no part is substantially present in the first, second and third zones;

(c) energizing the first and second actuators, and rotating the corresponding rollers, if the third switch indicates that a part is present in the third zone, and the first and second switches do not indicate substantial presence of a part in the first and second zones;

(d) moving the first stop to allow passage of parts past the first stop, if the third switch indicates that a part is present in the third zone, and the first and second switches do not indicate substantial presence of a part in the first and second zones;

(e) moving the second and third stops to part stopping positions, if the third switch indicates that a part is present in the third zone, and the first and second switches do not indicate substantial presence of a part in the first and second zones;

(f) deenergizing the first, second and third actuators if the first, second and third switches indicate presence of parts in the first, second and third zones;

(g) placing the first, second and third stops in part stopping positions, if the first, second and third switches indicate presence of parts in the first, second and third zones; and (h) maintaining gaps between parts in adjacent zones.

48. The method of claim 47 wherein each switch indicates presence of a part within the corresponding zone when the part physically contacts against the switch.

49. The method of claim 47 wherein at least the first and second stops are automatically movable in response to energization of attached electromagnetic devices.

50. The method of claim 47 further comprising communicating between the switches, stops and actuator, in a direct analog manner.

51. The method of claim 47 wherein at least one of the switches is an optical sensor.

52. A method of operating an accumulating power roll conveyor having at least three zones, with each zone having a set of rollers, an actuator, a part present indicating member and a zone clear indicating member, the method comprising:

(a) if a first switch indicates that the presence of a leading one of the parts has been sensed, and if a second switch does not indicate that the leading part is present, then a first actuator is energized;

(b) if a third switch indicates the presence of a trailing one of the parts then a second actuator is deenergized;

(c) if the third switch indicates the presence of the leading part, and if the second switch indicates the presence of the trailing part, then the first and second actuators are deenergized;

(d) longitudinally separating adjacent of the parts from each other by controlling energization and deenergization of adjacent of the actuators; and (e) controlling the conveyor free of a programmable logic controller.

53. The method of claim 52 further comprising:

(a) optically sensing presence of a part at a downstream location in the corresponding zone with each of the part present indicating members; and (b) optically sensing whether the part is present anywhere in the corresponding zone with each of the zone clear indicating members.

* * * * *